(12) United States Patent
Yang et al.

(10) Patent No.: US 9,413,702 B2
(45) Date of Patent: Aug. 9, 2016

(54) METHOD AND APPARATUS FOR DISTRIBUTING PUBLISHED MESSAGES

(75) Inventors: Xiaogang Yang, Beijing (CN); Jian Ma, Beijing (CN); Canfeng Chen, Beijing (CN)

(73) Assignee: Nokia Technologies Oy, Espoo (FI)

( * ) Notice: Subject to any disclaimer, the term of this patent is extended or adjusted under 35 U.S.C. 154(b) by 260 days.

(21) Appl. No.: 13/878,789

(22) PCT Filed: Oct. 29, 2010

(86) PCT No.: PCT/CN2010/078219
§ 371 (c)(1),
(2), (4) Date: Apr. 11, 2013

(87) PCT Pub. No.: WO2012/055111
PCT Pub. Date: May 3, 2012

(65) Prior Publication Data
US 2013/0198308 A1   Aug. 1, 2013

(51) Int. Cl.
*H04L 12/58*      (2006.01)
*H04L 12/725*     (2013.01)

(52) U.S. Cl.
CPC ............ *H04L 51/14* (2013.01); *H04L 12/5855* (2013.01); *H04L 45/306* (2013.01)

(58) Field of Classification Search
None
See application file for complete search history.

(56) References Cited

U.S. PATENT DOCUMENTS 6,487,548 B1 * 11/2002 Leymann et al. ............. 707/628
7,103,680 B1    9/2006 Holdsworth et al.
(Continued)

FOREIGN PATENT DOCUMENTS

CN      1465169 A    12/2003
CN      1953426 A    4/2007
(Continued)

OTHER PUBLICATIONS

Office action received for corresponding Chinese Patent Application No. 201080069900.1, dated Dec. 2, 2014, 11 pages of office action and 4 pages of office action translation.
(Continued)

*Primary Examiner* — Ranodhi Serrao
(74) *Attorney, Agent, or Firm* — Alston & Bird LLP

(57) ABSTRACT

A method for delivering published messages to subscribers comprises: —storing a set of subscriptions (F1_top1, F2_top3, F3_top4) in a routing table (RTO) of a first broker (BRO), —sending a set of messages ($e_1$, $e_2$, $e_3$) from the first broker (BRO) to a second broker (BR1) according to at least one subscription (F1_top1) stored in the routing table (RTO)1 —receiving a subsequent message ($e_k$), —determining a search term (topi) based on a data element of the subsequent message ($e_k$), —comparing the search term (topi) with a set of data elements stored in a relation repository (CRR), and —controlling sending of the subsequent message ($e_k$) to the second broker (BR1) according to a result of said comparison, wherein the set of data elements stored in the relation repository (CRR) comprises data elements of the messages ($e_1$, $e_2$, $e_3$) previously sent to the second broker (BR1), and wherein said set of subscriptions (F1_top1, F2_top3, F3_top4) contains at least one subscription (F3_top4), which specifies a topic (top4), which is not contained in the set of data elements stored in the relation repository (CRR).

20 Claims, 13 Drawing Sheets

(56) References Cited

U.S. PATENT DOCUMENTS

| | | | |
|---|---|---|---|
| 8,321,427 B2* | 11/2012 | Stampleman et al. | 707/749 |
| 2003/0097597 A1* | 5/2003 | Lewis | H04L 63/083 726/7 |
| 2003/0135556 A1* | 7/2003 | Holdsworth | 709/206 |
| 2004/0001498 A1 | 1/2004 | Chen et al. | |
| 2004/0236780 A1* | 11/2004 | Blevins et al. | 707/102 |
| 2006/0047666 A1 | 3/2006 | Bedi et al. | |
| 2006/0085507 A1 | 4/2006 | Zhao et al. | |
| 2006/0146999 A1 | 7/2006 | Thompson et al. | |
| 2007/0143442 A1 | 6/2007 | Zhang et al. | |
| 2008/0034045 A1* | 2/2008 | Bardsley | 709/206 |
| 2008/0133541 A1 | 6/2008 | Fletcher et al. | |
| 2008/0134202 A1 | 6/2008 | Craggs et al. | |
| 2008/0256553 A1 | 10/2008 | Cullen | |
| 2008/0294714 A1* | 11/2008 | Garza et al. | 709/202 |
| 2011/0099232 A1* | 4/2011 | Gupta et al. | 709/206 |
| 2011/0125921 A1* | 5/2011 | Karenos et al. | 709/240 |

FOREIGN PATENT DOCUMENTS

| | | | |
|---|---|---|---|
| CN | 101251860 A | | 8/2008 |
| WO | 02/15474 A2 | | 2/2002 |
| WO | 2004036382 A2 | | 4/2004 |

OTHER PUBLICATIONS

International Search Report and Written Opinion received for corresponding Patent Cooperation Treaty Application No. PCT/CN2010/078219, dated Aug. 11, 2011, 10 pages.

Extended European Search Report received for corresponding European Patent Application No. 10858840.1, dated May 22, 2014, 9 pages.

Tran et al., "A Random Projection Approach to Subscription Covering Detection in Publish/Subscribe Systems", International Conference on Collaborative Computing: Networking, Applications and Worksharing, Nov. 12-15, 2007, 9 pages.

Cao et al., "Efficient Event Routing in Content-Based Publish-Subscribe Service Networks", Twenty-third Annual Joint Conference of the IEEE Computer and Communications Societies, vol. 2, Mar. 7-11, 2004, pp. 929-940.

Office action received for corresponding Korean Patent Application No. 2013-7013661, dated Jun. 23, 2014, 3 pages of Office Action, No English Language Translation available.

Office Action for Chinese Application No. 201080069900.1 dated Jul. 23, 2015.

Office Action for Chinese Application No. 2010800699001 dated Dec. 28, 2015.

* cited by examiner

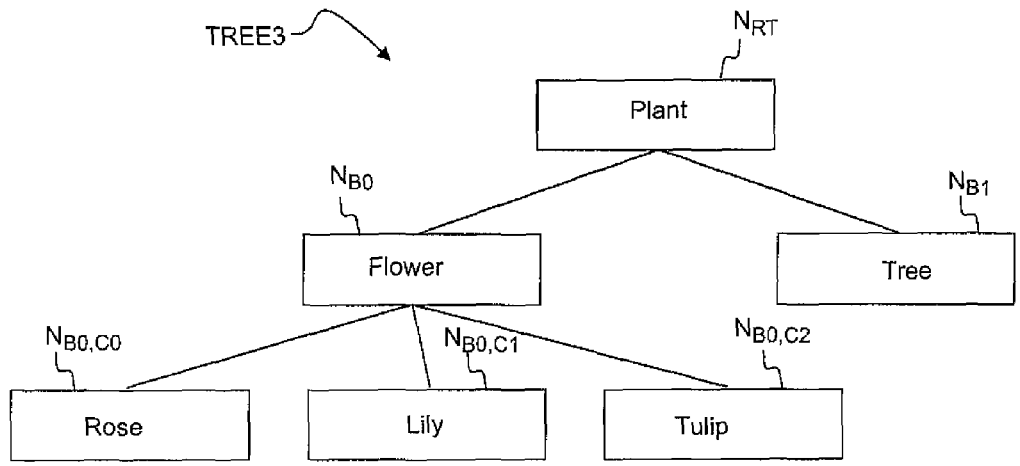
Fig. 6c
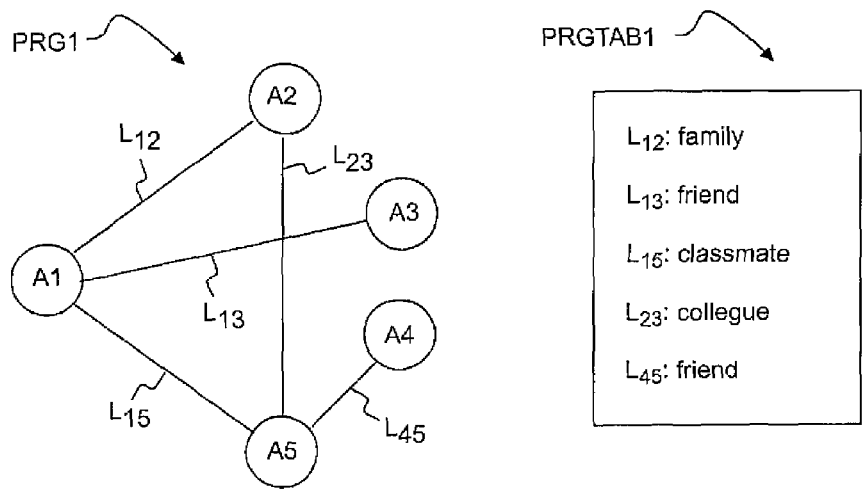
Fig. 6d
Fig. 6e

METHOD AND APPARATUS FOR DISTRIBUTING PUBLISHED MESSAGES

CROSS REFERENCE TO RELATED APPLICATIONS

This Application is a National Stage Entry of Patent Cooperation Treaty Application number PCT/CN2010/078219, which published as WO 2012/055111, the contents of which are herein incorporated by reference.

FIELD OF THE INVENTION

The present invention relates to distributing messages in a communications network.

BACKGROUND OF THE INVENTION

Within a messaging network, messages may be delivered from a publisher to a subscriber via message brokers that provide routing of the published message. The brokers are typically located at communication hubs within the network.

Publishers may send messages having a topic. The messages may be delivered to a set of subscribers who have registered their interest in receiving messages having said topic. Typically, the messages may be delivered so that the publishers do not need to know the identity or address of the subscribers.

The subscribers may register with a broker and identify the categories of information they wish receive, and this information is stored at the broker. In publish/subscribe implementations, subscribers specify one or more topic names which represent the information they wish to receive. Publishers assign topic names to messages that they send to the publish/subscriber broker. The broker may use a matching engine to compare the topics of received messages with the stored subscription information for a set of registered subscribers. This comparison determines which subscribers the messages should be forwarded to.

SUMMARY

An object of the invention is to provide a broker for publish/subscribe communications network. An object of the invention is to provide a method for operating a broker of a publish/subscribe communications network.

According to a first aspect of the invention, there is provided a method, comprising:

storing a set of subscriptions (F1_top1, F2_top3, F3_top4) in a routing table (RT0) of a first broker (BR0), sending a set of messages ($e_1$, $e_2$, $e_3$) from the first broker (BR0) to a second broker (BR1) according to at least one subscription (F1_top1) stored in the routing table (RT0), receiving a subsequent message ($e_k$), determining a search term (top1) based on a data element of the subsequent message ($e_k$), comparing the search term (top1) with a set of data elements stored in a relation repository (CRR), and controlling sending of the subsequent message ($e_k$) to the second broker (BR1) according to a result of said comparison, wherein the set of data elements stored in the relation repository (CRR) comprises data elements of the messages ($e_1$, $e_2$, $e_3$) previously sent to the second broker (BR1), and wherein said set of subscriptions (F1_top1, F2_top3, F3_top4) contains at least one subscription (F3_top4), which specifies a topic (top4), which is not contained in the set of data elements stored in the relation repository (CRR).

According to a second aspect of the invention, there is provided an apparatus (100) comprising a first broker (BR0), wherein the first broker (BR0) is configured:

to store a set of subscriptions (F1_top1, F2_top3, F3_top4) in a routing table (RT0), to send a set of messages ($e_1$, $e_2$, $e_3$) from a first broker (BR0) to a second broker (BR1) according to at least one subscription (F1_top1), to receive a subsequent message ($e_k$) to the first broker (BR0), to determine a search term (top1) based on a data element of the subsequent message ($e_k$).

to compare the search term (top1) with a set of data elements stored in a relation repository (CRR), and to control sending of the subsequent message ($e_k$) to the second broker (BR1) according to a result of said comparison, wherein the set of data elements stored in the relation repository (CRR) comprises data elements of the messages ($e_1$, $e_2$, $e_3$) previously sent to the second broker (BR1), and said set of subscriptions (F1_top1, F2_top3, F3_top4) contains at least one existing subscription (F3_top4), which specifies a topic (top4), which is not contained in the set of data elements stored in the relation repository (CRR).

According to a third aspect of the invention, there is provided a computer program, which when executed by a data processor is for performing a method comprising:

storing a set of subscriptions (F1_top1, F2_top3, F3_top4) in a routing table (RT0) of a first broker (BR0), sending a set of messages ($e_1$, $e_2$, $e_3$) from the first broker (BR0) to a second broker (BR1) according to at least one subscription (F1_top1) stored in the routing table (RT0), receiving a subsequent message ($e_k$), determining a search term (top1) based on a data element of the subsequent message ($e_k$), comparing the search term (top1) with a set of data elements stored in a relation repository (CRR), and controlling sending of the subsequent message ($e_k$) to the second broker (BR1) according to a result of said comparison, wherein the set of data elements stored in the relation repository (CRR) comprises data elements of the messages ($e_1$, $e_2$, $e_3$) previously sent to the second broker (BR1), and wherein said set of subscriptions (F1_top1, F2_top3, F3_top4) contains at least one subscription (F3_top4), which specifies a topic (top4), which is not contained in the set of data elements stored in the relation repository (CRR).

According to a fourth aspect of the invention, there is provided a computer-readable medium storing computer code, which when executed by a data processor is for performing a method comprising:

storing a set of subscriptions (F1_top1, F2_top3, F3_top4) in a routing table (RT0) of a first broker (BR0), sending a set of messages ($e_1$, $e_2$, $e_3$) from the first broker (BR0) to a second broker (BR1) according to at least one subscription (F1_top1) stored in the routing table (RT0), receiving a subsequent message ($e_k$), determining a search term (top1) based on a data element of the subsequent message ($e_k$), comparing the search term (top1) with a set of data elements stored in a relation repository (CRR), and controlling sending of the subsequent message ($e_k$) to the second broker (BR1) according to a result of said comparison, wherein the set of data elements stored in the relation repository (CRR) comprises data elements of the messages ($e_1$, $e_2$, $e_3$) previously sent to the second broker (BR1), and wherein said set of subscriptions (F1_top1, F2_top3, F3_top4) contains at least one subscription (F3_top4), which specifies a topic (top4), which is not contained in the set of data elements stored in the relation repository (CRR).

Further aspects of the invention are defined in the dependent claims.

Thanks to the invention, in-coming messages which substantially correspond to previously subscribed messages may be forwarded fast and efficiently without a time-consuming search in a subscription database.

When a first broker has previously sent several messages to a second neighboring broker, the in-coming message may be compared with the previously sent messages. For example, a first in-coming message may contain an image of a flower. If several images of a flower have been previously forwarded to a second broker, the first broker may determine that the first in-coming message sufficiently matches with the previously sent messages. In this case, the in-coming message may be rapidly forwarded to the same address as said previous messages, i.e. to the second broker.

If a second in-coming message does not match with the previously forwarded messages, then the second in-coming message may be forwarded at a later stage by using a conventional routing table.

Conventionally, the messages are processed and distributed according to a routing table which contains the existing subscriptions. A routing table may comprise e.g. millions of subscriptions which should be individually checked. In the worst case, an individual message should be matched with each subscription of the routing table.

Searching and matching in the routing table may represent a first level of operation. At the first level, messages are delivered according to individual subscriptions. The method and apparatus according to the invention provide a second level of operation, in addition to the searching and matching in a subscription database. At the second level of operation, priority may be given to delivering those messages, which represent a large proportion of all published messages, and which also correspond to the most popular topics specified in the existing subscriptions. The second level of operation could be called as a wholesale level of operation, whereas the first level of operation could be called as a retail level of operation. Thanks to the invention, the available data processing capacity may be allocated in an optimum way, taking into account the supply of published messages and the existing demand for messages.

Before having to check through a long list of subscribed topics, the broker may fast and efficiently distribute a major fraction of the messages according to a shorter list (CRR repository) associated with the most popular topics. Subscriptions and publications contribute to the list.

A certain topic may be defined in several subscriptions, but the topic is not entered into the CRR repository until at least one message matches with the topic. Thus the matching may be performed in a space partitioned by typical message contents instead of a space partitioned by individual subscriptions. Thanks to the invention, a significant fraction of the in-coming messages may be processed and distributed according to a classification scheme (indexing), which is optimized for handling the most typical subscribed messages. This may improve speed of the communications network, i.e. to increase the number of different messages delivered per unit time.

Thanks to the invention, an in-coming message may be forwarded also in cases where the subscription does not exactly match with the in-coming message. This may increase the probability for delivering a message successfully also in a situation where the subscription is not accurately defined, and where conventional publication-subscription matching methods have a low efficiency.

In an embodiment, a matching task may be converted into an image search task.

In an embodiment, semantic matching may be supported.

BRIEF DESCRIPTION OF THE DRAWINGS

In the following examples, the embodiments of the invention will be described in more detail with reference to the appended drawings, in which FIG. 6c shows, by way of example, a subject semantic hierarchy tree, FIG. 6d shows, by way of example, a personal relationship graph, FIG. 6e shows, by way of example, a table defining the types of personal relationships for the graph of FIG. 6d.

DETAILED DESCRIPTION

Figure 1:
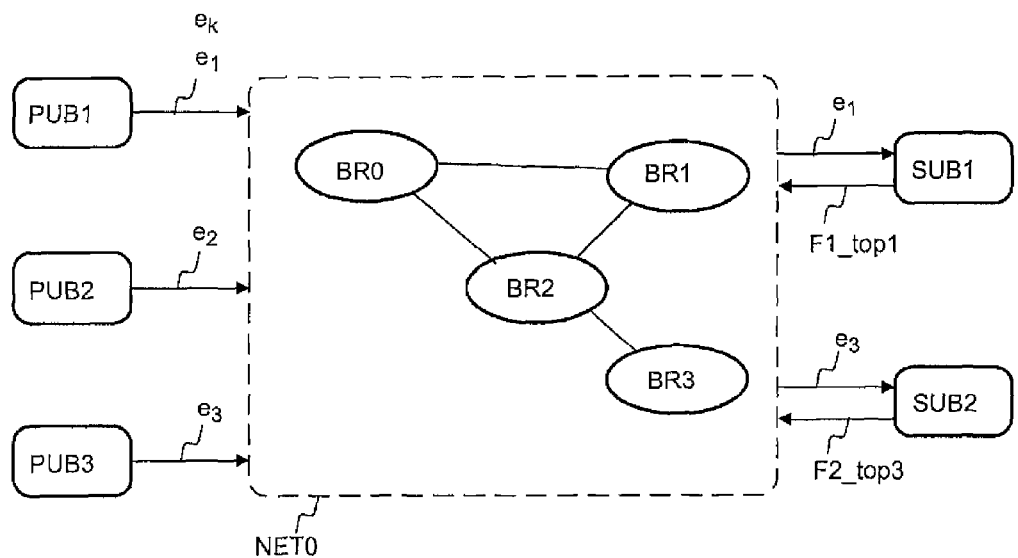
FIG. 1 shows, by way of example, a publish/subscribe network.

Referring to FIG. 1, messages $e_1$, $e_2$, $e_3$, $e_k$ provided by publishers PUB1, PUB2, PUB3 may be distributed to subscribers SUB1, SUB2 via a communications network NET0. The network NET0 may comprise a plurality of brokers BR0, BR1, BR2, BR3. The subscribers SUB1, SUB2 may order messages by submitting subscriptions F1, F2 to the network NET0. A single subscription F1 may specify one or more topics top1, top2, top3, top4 .... A subscription F1_top1 sent by a first subscriber SUB1 may specify a first topic top1, and a subscription F2_top sent by a second subscriber SUB2 may specify a second topic top3. An individual subscriber SUB1 may have several subscriptions associated with different topics (e.g. top1, top2). Two or more different subscribers SUB, SUB2 may subscribe the same topic (e.g. top1).

The network NET0 may be e.g. the Internet, a Local Area Network (LAN) or a Wide Area Network (WAN). The network NET0 may comprise e.g. the Internet, a Local Area Network (LAN) and/or a Wide Area Network (WAN).

A message $e_1$, $e_2$, $e_3$ $e_k$ may also be called as an event. A topic of a message may be specified by a data element of the message.

A message may contain an image, e.g. a photograph. The message may be an image event.

Figure 2:
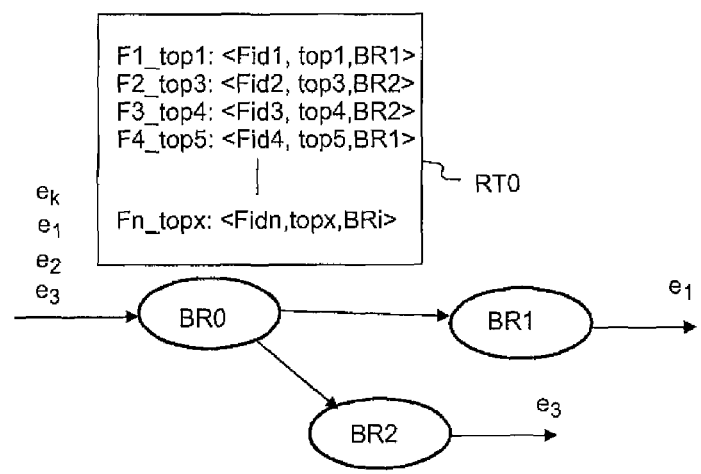
FIG. 2 shows, by way of example, a method for routing messages by using subscriptions stored in a routing table.

FIG. 2 shows matching subscriptions F1, F2 with messages $e_1$, $e_2$, $e_3$, $e_k$ by using a routing table RT0. The message broker BR0 may receive subscription requests F1, F2 specifying topics top1, top3. Each request F1, may be associated with an identifier Fid, a topic, and an address of a next broker (e.g. BR1) where an in-coming message $e_k$ should be sent to, if the topic of the message $e_k$ matches with the topic of the subscription F1. The subscriptions F1, F2 and the corresponding addresses BR1, BR2, BRi may be stored in a subscription list RT0. The subscription list RT0 may also be called as a routing table. The subscription identifier Fid associated with each subscription request may be unique.

For example, a subscription F1_top1 may be associated with an identifier Fid1, a topic top1, and a broker address BR1. A subscription Fn_topx may be associated with an identifier Fidn, a topic topx, and a broker address BRi. The identifiers Fid1, Fid2, Fid3, Fid4 ... Fidn may be associated with the $1^{st}$ subscription (F1_top1), the $2^{nd}$ subscription (F2_top3), the $3^{rd}$ subscription (F3_top4), the $4^{th}$ subscription (F4 top5) and the $n^{th}$ subscription (Fn_topx).

When a new message $e_k$ arrives at the first broker BR0, the topic of the message may be compared with topics of the subscriptions stored in the routing table RT0. For example, a message $e_1$ may have a topic top1, a message $e_2$ may have a topic top2, and a message $e_3$ may have a topic top3. According to the routing table RT0 shown in FIG. 2, the message $e_1$ may be forwarded from the first broker BR0 to the second broker BR1, and the message $e_3$ may be forwarded to the third broker BR2. In this example, the topic top2 of the message $e_2$ does not match with any items of the routing table RT0, and the message $e_2$ is not forwarded.

The messages $e_1$, $e_2$, $e_3$, $e_k$ may be optionally stored in a memory of the first broker BR0. The messages $e_1$, $e_2$, $e_3$, $e_k$ may be deleted from a memory of the first broker BR0 after forwarding or after it has been determined that there are no existing subscriptions. In particular, a message may be deleted from a memory of the broker BR0 if all subscriptions for a topic of the message have been canceled.

Figure 3A:
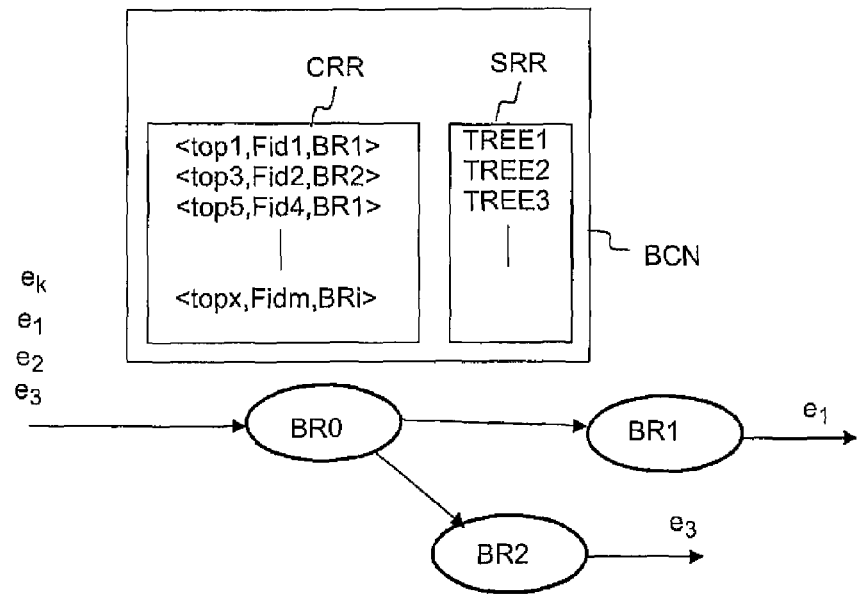
FIG. 3a shows, by way of example, routing messages by using a relation repository.

Referring to FIG. 3a, a message $e_k$ received by the first broker BR0 may be compared with topics of previously forwarded messages in order to establish whether the message should be sent forward, and in order to establish the address of a next broker (e.g. BR1 and/or BR2) where the message should be sent to.

The comparison may be performed by using a relation repository BCN. The repository BCN may comprise a semantic relation repository SRR, and a clustering relation repository CRR.

Instead of containing a list of individual subscriptions F1, F2, the clustering relation repository CRR may comprise data elements of messages previously received and forwarded. The data elements may be called as "topics".

The number of different topics stored in the clustering relation repository CRR may be substantially smaller than the number of subscriptions stored in the routing table RT0.

The data elements of the previously forwarded messages may be partitioned into clusters according to various different criterions. The data elements stored in the clustering relation repository CRR may be arranged such that they can be rapidly searched according to relevant search terms. The data elements stored in the clustering relation repository CRR may be arranged as an indexed table. The data elements stored in the clustering relation repository CRR may represent messages previously forwarded to a next broker. The data elements stored in the clustering relation repository CRR may be data elements of messages previously forwarded to a next broker.

Each data element stored in the clustering relation repository CRR may be associated with a broker address. The data elements top1, top3 ... topx stored in the clustering relation repository CRR may be associated with broker addresses (e.g. BR1, BR2, ... BRi). The data elements top1, top3 ... topx stored in the clustering relation repository CRR may also be associated with subscription identifiers Fid1, Fid2, ..., Fidm. Subscriptions stored in the routing table RT0 corresponding to data elements stored in the clustering relation repository CRR may be rapidly identified and retrieved by using the subscription identifiers Fid. The topics, the associated identifiers, and the associated addresses may be stored in the clustering relation repository CRR. For example, a topic top1 stored in the clustering relation repository CRR may be associated with a subscription identifier Fid1 and a broker address BR1. This means that a message having the topic top1 has been previously forwarded to the broker address BR1, and that the previously forwarded message corresponds to a subscription specified by the identifier Fid1.

The topics, the identifiers and the addresses may be stored as nodes in the clustering relation repository CRR. The clustering relation repository CRR may comprise a plurality of nodes, wherein an individual node may in turn comprise a topic top, an associated identifier Fid, and an associated broker address BR. For example a node <top1,Fid1,BR1> may comprise a data element top1, a subscription identifier Fid1, and a broker address BR1. In an embodiment, a single node may comprise only one subscription identifier and only one broker address associated with a single topic.

The node <top3,Fid2,BR2> may comprise a data element top3, a subscription identifier Fid2, and a broker address BR2. The node <top5,Fid4,BR1> may comprise a data element top5, a subscription identifier Fid4, and a broker address BR1. The node <topx,Fidm,BRi> may comprise a data element topx, a subscription identifier Fidm, and a broker address BRi.

The routing table RT0 and the clustering relation repository CRR may be stored in separate memory areas.

However, the clustering relation repository CRR may also be an indexed part of the routing table RT0. It may be noticed that the routing table RT0 and the clustering relation repository CRR may comprise similar nodes (See FIGS. 2 and 3a). An individual subscription node stored in the routing table RT0 may comprise a combination of a subscription identifier, a topic, and a broker address. An individual node of the clustering relation repository CRR may also comprise a combination of a subscription identifier, a topic, and a broker address. Thus, the clustering relation repository CRR may also be an indexed portion of the routing table RT0, supplemented with pointers and/or additional identifiers. Some of the subscriptions of the routing table RT0 may also belong to the clustering relation repository CRR. Subscriptions of the routing table RT0 belonging to the clustering relation repository CRR may be rapidly identified and retrieved e.g. by using pointers stored in an auxiliary pointer table.

Figure 3B:
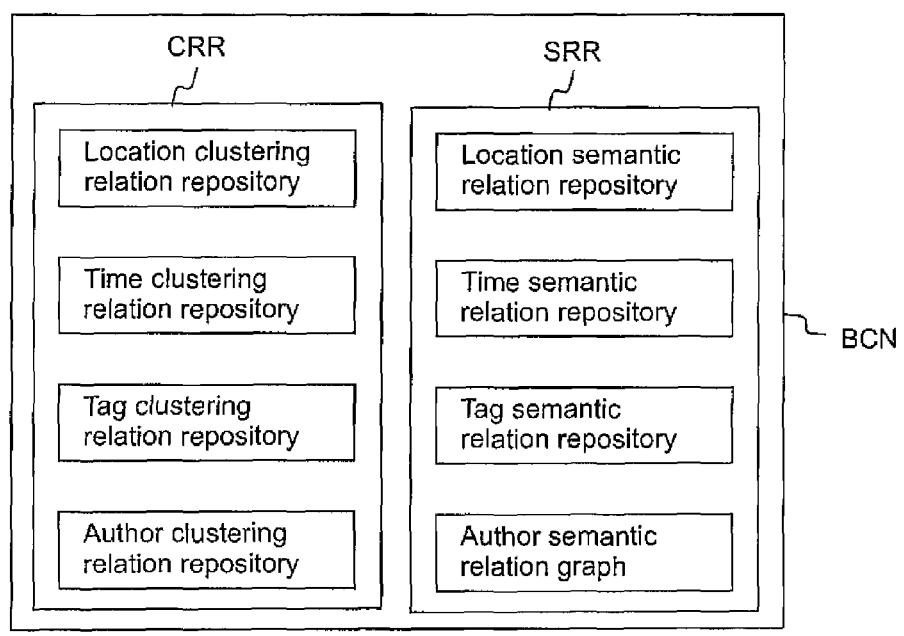
FIG. 3b shows, by way of example, a relation repository comprising a semantic relation repository and a clustering relation repository.

Referring to FIG. 3b, the semantic relation repository SRR may contain a location semantic relation repository, a time semantic relation repository, a tag semantic relation repository, and an author semantic relation repository. The semantic relation repository SRR may comprise e.g. semantic trees TREE1, TREE2, TREE3 in order to provide additional search terms (See FIGS. 6a-6d). The author semantic relation repository may comprise one or more personal relation graphs.

The clustering relation repository CRR may comprise a location clustering relation repository, a time clustering relation repository, a tag clustering relation repository, and an author clustering relation repository.

Advantageously, the clustering relation repository CRR should not contain data elements, which do not match with data elements of previously forwarded messages. The clustering relation repository CRR may contain fewer data elements than the routing table RT0 in order facilitate fast searching. For example, the number of nodes of a clustering relation repository CRR may be smaller than 50% of the number of individual subscriptions in the routing table RT0. In particular, the number of nodes of a clustering relation repository CRR may be smaller than 10% of the number of individual subscriptions stored in the routing table RT0.

Several subscriptions stored in the routing table RT0 may specify topics which are not contained in the set of data elements stored in the relation repository (BCN). At least one subscription (e.g. F3_top4) stored in the routing table RT0 may specify a topic (e.g. top4) which is not contained in the set of data elements stored in the clustering relation repository CRR.

For simplicity, the notation "e" may refer to a message and/or to a data element (topic) of a message in the following discussion and in the drawings. In particular, the notation $e_k$ may refer to a message $e_k$ and/or to a data element of the message $e_k$. "Matching a message $e_k$" may refer to "matching a data element of a message $e_k$." "Partitioning a message $e_k$ into a cluster" may refer to "partitioning a data element of the message $e_k$ into said cluster".

It is emphasized that the clustering relation repository CRR does not need to store the entire contents of the previously sent messages. For example, if the previously forwarded messages contained photographs, it is not necessary to store the photographs in the repository BCN. It may be enough if the topics (data elements) and the associated addresses are stored. The topics and the addresses of the previously forwarded messages may be stored in the clustering relation repository as indexed clusters.

The repository BCN may also be called as a "Broker Context Network". In particular, the repository BCN may be optimized and indexed for handling image data.

Figure 3C:
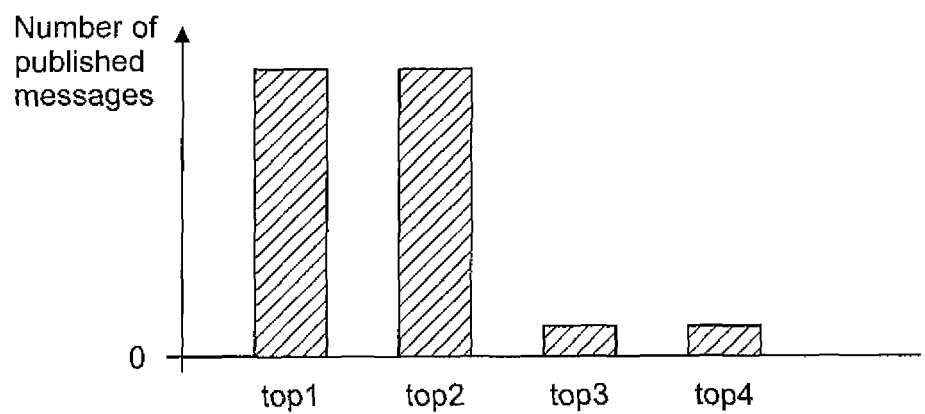
FIG. 3c is a bar graph showing, by way of example, the number of published messages associated with different topics.

FIG. 3c is a bar graph showing, by way of example, the number of published messages associated with different topics. A high number of published messages may have a topic top1 or a topic top2. Only a small number of published messages may have a topic top3 or a topic top4.

Figure 3D:
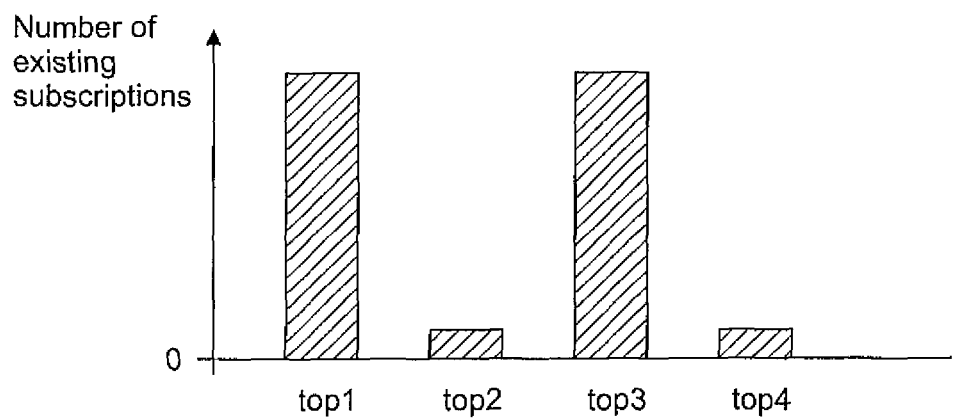
FIG. 3d is a bar graph showing, by way of example, the number of subscriptions associated with different topics.

FIG. 3d is a bar graph showing, by way of example, the number of subscriptions associated with different topics. A high number of subscriptions F1, F2 may specify a topic top1 or top3. Only a small number of the subscriptions may specify a topic top2 or top4.

Figure 3E:
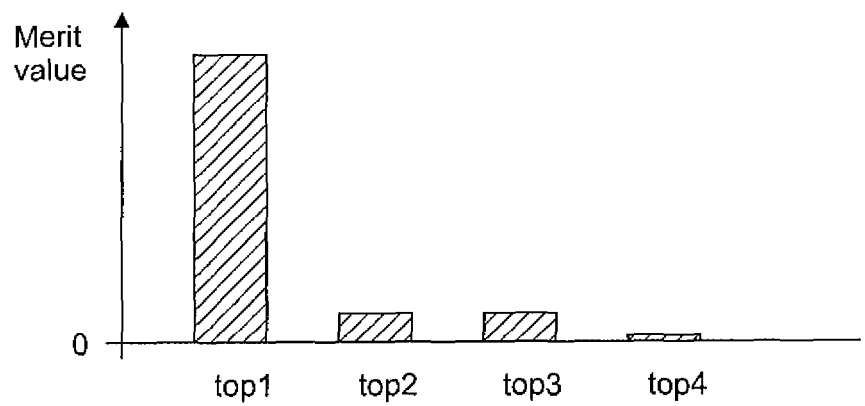
FIG. 3e is a bar graph showing, by way of example, merit values associated with different topics.

FIG. 3e is a bar graph showing, by way of example, merit values associated with the topics. A high number of published messages in FIG. 3c had the topic top1, and also a high number of the subscriptions in FIG. 3d specified the topic top1. Thus, priority may be given to forwarding messages having the topic top1 to a predetermined broker (e.g. BR1). The topic top1 may have a high merit value.

When handling messages associated with different topics, priority may be given to delivering those messages, which represent a large proportion of all published messages, and which also correspond to the most popular topics specified in the existing subscriptions.

As to the topics top2, top3, and top4, it may be noticed that the number of published messages and/or the number of subscriptions is low. Consequently, handling of messages having the topic top2, top3, top4 may be of secondary importance when forwarding the messages to the predetermined broker (e.g. BR1). The topics top2, top3, top4 may have a low merit value.

When delivering the messages, an individual merit value may be determined for each combination of a topic and a broker address. For example, a message may get a priority delivery to a predetermined broker only when the merit value determined for the topic of the message and the address exceeds a certain limit. Messages having a low merit value may be stored in a buffer memory and they may be delivered later according to the routing table RT0, e.g. when the data processing capacity of the broker BR0 is not in heavy use.

Figure 4:
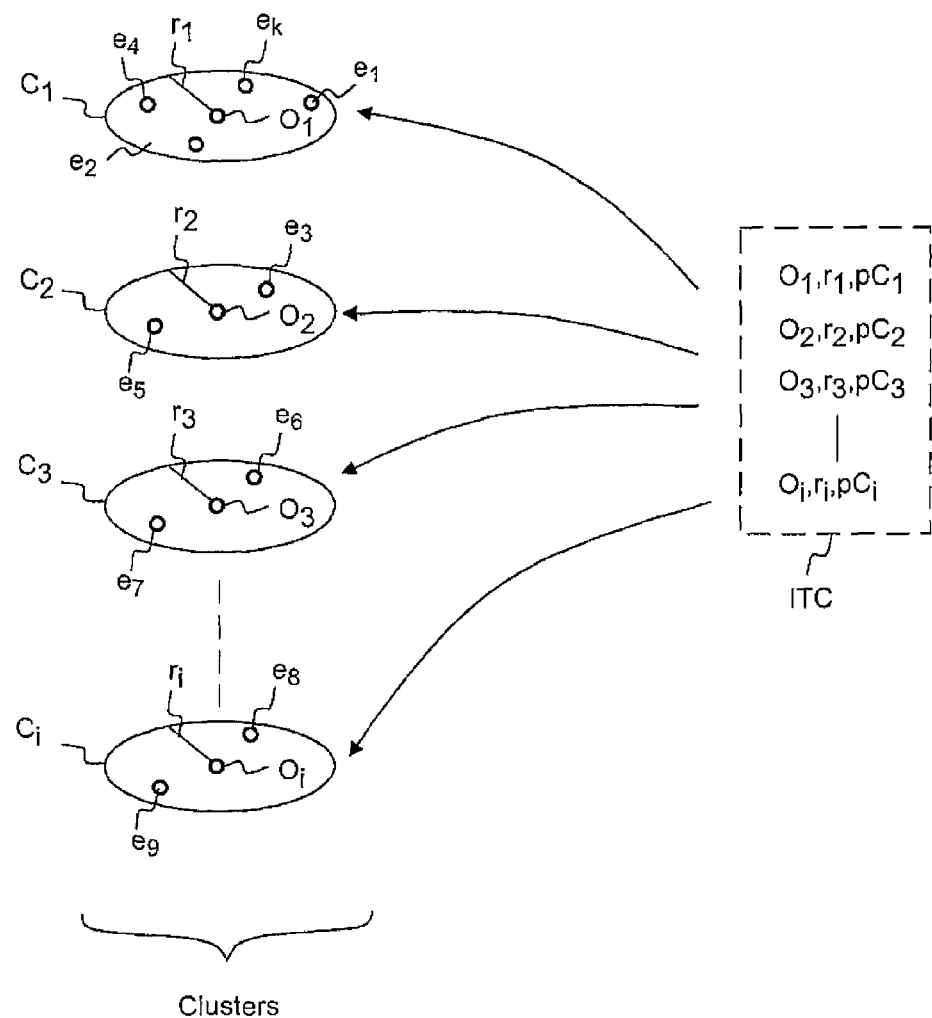
FIG. 4 shows, by way of example, partitioning messages according to a quantitative difference or distance between data elements of the messages.

Referring to FIG. 4, the data elements of previously received messages may partitioned into nodes of clusters $C_1$, $C_2$, $C_3$ . . . $C_i$ according to a single property. The single property may be e.g. location, time, subject, or identity of an author.

For example, data elements of messages e whose data element (topic) is within a first distance $r_1$ from a first clustering center $O_1$ may form a first cluster $C_1$. In other words, when a difference or a distance between the data element of a message $e_1$ and the first clustering center $O_1$ is smaller than a predetermined limit $r_1$, then the data element of a message $e_1$ may belong to the first cluster C1.

Data elements of messages e whose data element (topic) is within a distance $r_2$ from a second clustering center $O_2$ may form a second cluster $C_2$. Data elements of messages e whose data element (topic) is within a distance $r_3$ from a third clustering center $O_2$ may form a third cluster $C_2$. Data elements of messages e whose data element (topic) is within a distance $r_i$ from a clustering center $O_2$ may form a cluster $C_i$. The distances $r_1$, $r_2$, $r_3$, $r_i$ may be substantially equal.

The difference or distance $r_1$ may be determined in a time space (temporal distance), or in a location space (spatial distance).

A spatial distance $r_1$ may be e.g. a Euclidian distance, Manhattan distance or a difference between coordinates. For example, if images have been taken at locations which are less than 1 km from each other, then the corresponding messages may be partitioned into the same cluster.

The location may also be determined e.g. by GPS coordinates (Global Positioning System) or by using another spatial coordinate system. An additional database may be used for converting location names to coordinates. For example, according to a coordinate system, the location coordinates of Beijing may be 39° 55' 44 North and 116° 231' 18 East. A distance may also be defined by using spatial coordinates.

Also the height coordinate may be taken into consideration. For example, data elements of messages containing photographs taken below the sea level may be partitioned into a first cluster, and data elements of messages containing photographs taken at heights above 4000 meters (e.g. at mountain regions) may be partitioned into a second cluster.

A temporal distance $r_1$ may be a temporal separation between two events. For example if the date of taking a photograph of a first message is within two days from the date of taking a photograph of a second message, the first message and the second message may be partitioned into the same time cluster.

An additional database may be used for converting verbally expressed dates to numerical dates. E.g. "labor day" has the same meaning as "1 May".

Messages associated with the same subject may be partitioned into the same cluster. Messages containing identical tag strings may be partitioned into the same cluster.

Additionally, messages containing different tag strings may be partitioned into the same cluster if the tag strings have the same meaning. An additional dictionary or thesaurus may be used for establishing the meanings.

Messages associated with the same author may be partitioned into the same cluster. Additionally, messages containing different author strings may be partitioned into the same cluster if the different author names are known to refer to the same person. A data element of a message may contain a nickname of a person instead of the real name of said person. An additional database may be used for establishing the identity of the author.

In case of FIG. 4, the distances for the clusters $C_1$, $C_2$, $C_3 \ldots C_i$ are evaluated in the same space. For a given set of distances $r_1, r_2, r_3, r_i$, the clustering centers $O_1, O_2, O_3, O_i$ may be selected such that the number of the clusters $C_1$, $C_2$, $C_3 \ldots C_i$ is minimized. One of the previously received messages may be selected to be a clustering center $O_1$. Alternatively, the clustering center $O_1$ may be an artificial point which does not exactly match with a data element of any previously received message.

The clusters $C_1$, $C_2$, $C_3 \ldots C_i$ may be arranged such that they may be rapidly identified and/or retrieved by using hash pointers $pC_1$, $pC_2$, $pC_3 \ldots pC_i$. Each cluster $C_i$ may be described by a clustering center $O_i$ and the radius $r_i$. The center $O_i$ of each cluster may be indexed by using a hash pointer $pC_i$. The pointers associated with the clustering centers $O_i$ may be stored in an index table ITC. The pointers $pC_1$, $pC_2, pC_3 \ldots pC_i$ may be stored by e.g. using a B+ tree (B plus tree) in order to allow rapid search.

Thus, the index table ITC may comprise a plurality of indexed data elements associated with pointers $pC_1$, $pC_2$, wherein a pointer $pC_1$ associated with an indexed data element $O_1$ indicates a cluster $C_1$ of data elements stored in the repository CRR, and the distance between each data element of the cluster $C_1$ and the indexed data element $O_1$ is smaller than or equal to a predetermined distance $r_1$.

In spatial clustering, the nodes of a cluster $C_1$ may be spatially close to a data element of the in-coming message $e_k$. The nodes $e_1, e_2, e_4$ of the cluster $C_1$ may be rapidly retrieved after the relevant cluster $C_1$ has been identified. A search by using the clustering centers $O_i$ may provide a fast way for identifying a cluster $C_1$, which is relevant to the in-coming message $e_k$.

A data element (topic) of a message stored in the clustering relation repository CRR may be called as a node. Each node $e_1, e_2, e_4$ of the cluster $C_1$ may represent a message, which has been previously sent to a next broker. Thus, each node $e_1$, $e_2$, $e_4$ of the cluster $C_1$ may be associated with a broker address BR1, BR2, ... BRi. An individual node of the cluster C may comprise a topic associated with a subscription identifier and a broker address.

As several nodes $e_1, e_2, \ldots$ of the cluster $C_1$ may be relevant regarding a data element of the in-coming message $e_k$, a search in the context relation clusters may provide one or more broker addresses BR1, BR2, ... BRi where the in-coming message $e_k$ should be forwarded to.

However, the in-coming message $e_k$ is not typically forwarded to all broker addresses BR1, BR2, associated with nodes $e_1, e_2, e_4$ of the relevant cluster $C_1$ Each address BR1, BR2, ... BRi may be associated with a merit value. For example, a merit value for delivering the message $e_k$ to a broker address NRi may be marked as $SCORE_{ek,BRi}$.

The in-coming message $e_k$ may be forwarded to specific broker address (e.g. BK1) when the merit value $SCORE_{ek,BR1}$ exceeds a predetermined limit (e.g. $LIM_1$). The merit value may also be called as a "rank".

If a majority of the nodes $e_1, e_2, \ldots$ of a cluster $C_1$ are associated with the same broker address (e.g. BK1), then the clustering center $O_{kL}$ of the cluster $N_{kL}$ may be associated with the same broker address (BK1).

Figure 5A:
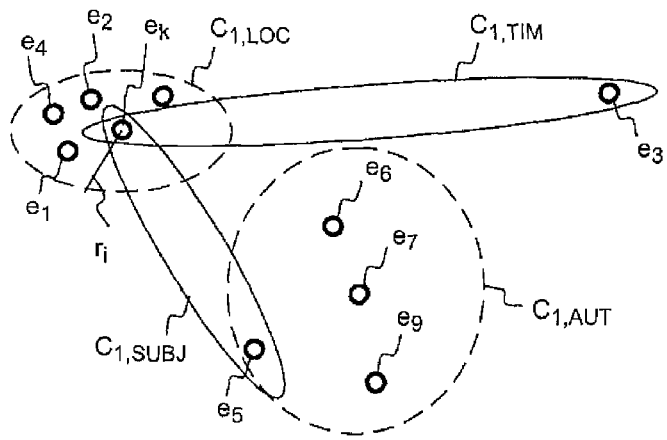
FIG. 5a shows, by way of example, partitioning messages into clusters according to different properties.
Figure 5B:
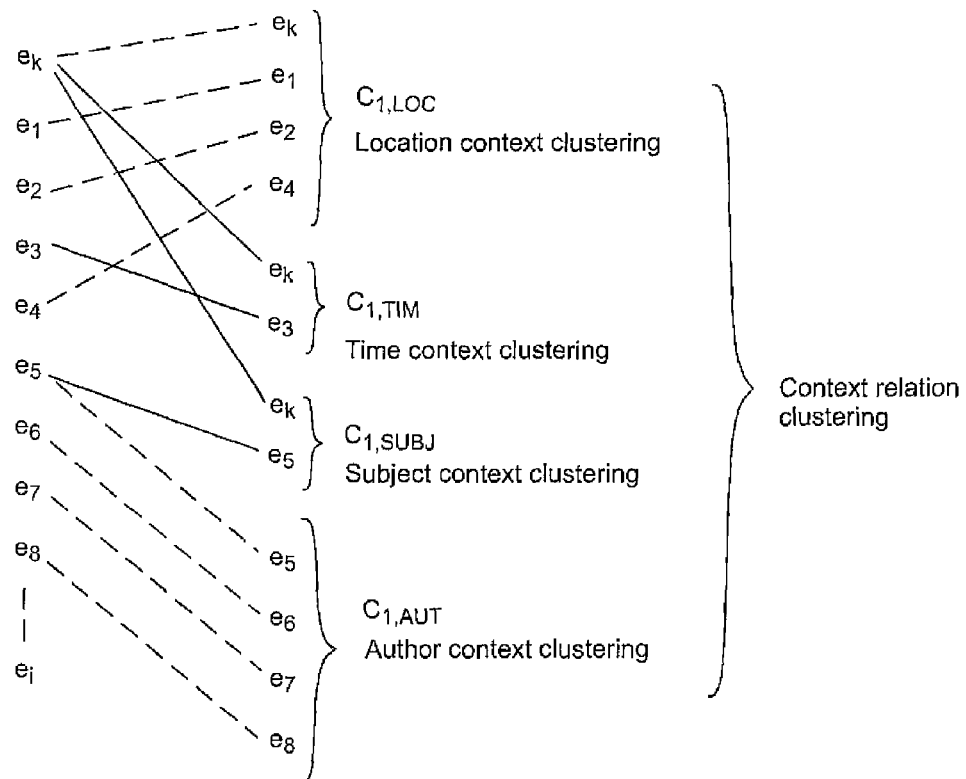
FIG. 5b shows, by way of example, partitioning of messages into clusters according to different properties.

Referring to FIGS. 5a and 5b, the same message (i.e. data element of the message or node comprising the data element) $e_k$ may be related to several different clusters $C_{1,LOC}$, $C_{1,TIM}$, $C_{1,SUBJ}$, $C_{1,AUT}$ according to the context. The context may be e.g. location, time, subject, or author. $e_k, e_1, e_2, e_3 \ldots e_i$ denote different messages. The subject may also be called as a "tag".

The data elements of the cluster $C_{1,LOC}$ may be spatially close to each other, and the data elements of the cluster $C_{1,TIM}$ may be temporally close to each other. The data elements of the cluster $C_{1,SUBJ}$ may refer to the same subject. The data elements of the cluster $C_{1,AUT}$ may refer to the same author.

The messages $e_k, e_1, e_2, \ldots$ may comprise e.g. photographs. Based on the clustering, it may be deduced that the message $e_k$ is spatially related to the messages $e_1, e_2, e_4$, because the corresponding images were taken at locations which were close to each other. The data element of the in-coming message $e_k$ may be considered to substantially match a message $e_1$ because a difference between the data element of the in-coming message $e_k$ and a data element of the message $e_1$ is smaller than a predetermined spatial distance (limit $LIM_1$).

The in-coming message $e_K$ may be related to a message $e_3$, because the images included in the messages $e_k, e_3$ were taken e.g. during the same day.

The in-coming message $e_K$ may be related to a message $e_5$, because the images included in the messages $e_K, e_5$ depict the same subject, e.g. a rose.

Data elements of $e_5$, $e_6$, $e_7$, $e_8$ may belong to the same cluster $C_{1,AUT}$ when images included in the messages were taken by the same author.

In this example, an image included in the message $e_k$ was taken by a different author than the images included in the messages $e_5$, $e_6$, $e_7$, $e_8$. Thus, the in-coming message $e_k$ is not related to the cluster $C_{1,AUT}$.

A search in the clustering relation repository CRR may comprise checking whether a data element of an in-coming message $e_k$ matches a data element of a previously sent message $e_1, e_2$. A search in the clustering relation repository CRR may comprise checking whether a data element of an in-coming message $e_k$ exactly matches a data element of a previously sent message $e_1, e_2$. A search in the clustering relation repository CRR may comprise checking whether a data element of an in-coming message $e_k$ approximately matches a data element of a previously sent message $e_1, e_2$. Partitioning of the previously sent messages $e_1$, $e_2$ into clusters $C_1$, $C_2$, ... $C_i$ may facilitate rapid identification of the relevant messages.

A data element may be considered to match with the data element of an in-coming message $e_k$ when a difference or a distance between the data element in the clustering relation repository CRR and the data element May 2008 of the in-coming message $e_k$ is smaller than a predetermined limit $r_i$.

A data element may be considered to approximately match with the data element of an in-coming message $e_k$ when a difference or a distance between the data element in the clustering relation repository CRR and the data element May 2008 of the in-coming message $e_k$ is smaller than a predetermined limit $r_i$, and the distance is greater than zero. In case of approximate matching, the data element of an in-coming message $e_k$ is different from the data element in the clustering relation repository CRR.

A data element may be considered to exactly match with the data element of an in-coming message $e_k$ when a difference or a distance between the data element in the clustering relation repository CRR and the data element May 2008 of the in-coming message $e_k$ is zero.

FIGS. 4-5b show context relation clustering of the messages.

Figure 6A:
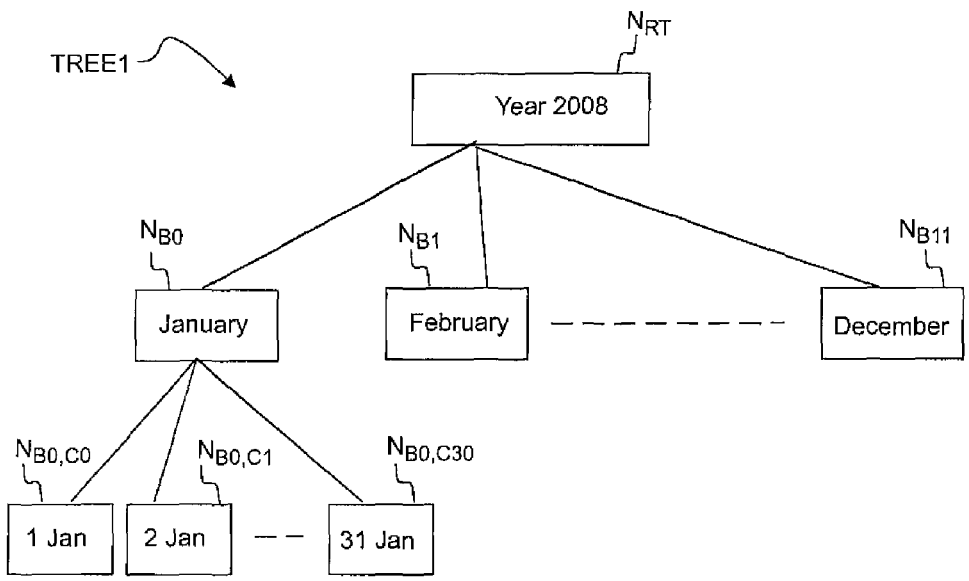
FIG. 6a shows, by way of example, a time semantic hierarchy tree.
Figure 6B:
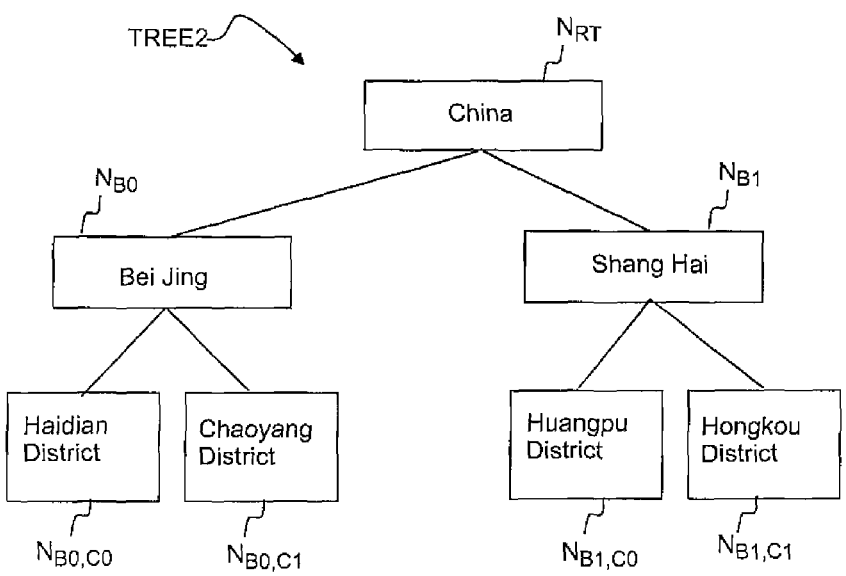
FIG. 6b shows, by way of example, a location semantic hierarchy tree.

When searching for previously sent messages which are related to the in-coming message $e_k$, the query may be expanded also by using semantic hierarchy trees shown e.g. in FIGS. 6a-6c. For a single message $e_k$, several searches may be performed by using auxiliary search terms, which are semantic ancestors or semantic descendants of the data element of the in-coming message $e_k$.

A semantic ancestor node has a broader meaning than the original data element of the in-coming message $e_k$. The ancestor node of a specific node is at a higher level of a hierarchy three than the specific node.

A semantic descendant node has a narrower meaning than the original data element of the in-coming message $e_k$. The descendant node of a specific node is at a lower level of a hierarchy tree than the specific node.

The auxiliary search terms may be provided by using semantic hierarchy trees shown in FIGS. 6a-6c. Auxiliary search terms may also be provided by using a personal relation graph shown in FIG. 6d.

FIG. 6a shows a semantic hierarchy tree TREE1 for a date, i.e. a hierarchy for expressions defining a date.

The root node $N_{RT}$ of the tree TREE1 may define e.g. the year of the date. The root node $N_{RT}$ may be called as the year node. The year node may have 12 child nodes $N_{B0}$, $N_{B1}$, ... $N_{B11}$, wherein each child node defines the month of the date. These child nodes $N_{B0}$, $N_{B1}$, ... $N_{B11}$ may be called as the month nodes. Each month node may, in turn, have 28-31 child nodes, wherein each child node defines a day of the date.

The nodes $N_{B0}$, $N_{B1}$ ... $N_{B11}$ denote the child nodes of the node $N_{RT}$. $N_{RT}$ is the parent node of the nodes $N_{B0}$, $N_{B1}$, ... $N_{B11}$. The nodes $N_{B0,C0}$, $N_{B0,C30}$ denote the child nodes of the node $N_{B0}$. $N_{B0}$ is the parent node of the nodes $N_{B0,C0}$, $N_{B0,C1}$, ... $N_{B0,C30}$. The nodes $N_{RT}$ and $N_{B0}$ are ancestor nodes for each of the nodes $N_{B0,C0}$, $N_{B0,C1}$, ... $N_{B0,C30}$. The node $N_{B1}$ is not an ancestor node of the node $N_{B0,C0}$. The nodes $N_{B0}$, $N_{B1}$, $N_{B11}$, $N_{B0,C0}$, $N_{B0,C1}$, ... $N_{B0,C30}$ are descendant nodes of the node $N_{RT}$. The node $N_{B0,C0}$ is not a descendant node of the node $N_{B1}$.

FIG. 6b shows a semantic tree TREE2 for location, i.e. a hierarchy for expressions defining location. The root node $N_{RT}$ of the tree TREE2 may define e.g. a state of a location. The root node may have a plurality of child nodes $N_{B0}$, $N_{B1}$, ... to define a province or a major city. Each province node $N_{B0}$, $N_{B1}$ may in turn have child nodes $N_{B0,C0}$, $N_{B0,C1}$, $N_{B1,C0}$, $N_{B1,C1}$ to define a district or a village.

A search in the clustering relation repository CRR may be expanded by using a semantic hierarchy tree stored in the semantic relation repository SRR. For example, when a data element of the in-coming message $e_k$ specifies a topic "Shang Hai" (node $N_{B1}$), the search term may also be an ancestor node ($N_{RT}$) of the node $N_{B1}$ and/or a descendant node ($N_{B1,C0}$ or $N_{B1,C1}$) of the $node_{B1}$.

When searching and matching in the clustering relation repository CRR, the search term may be a data element of the in-coming message $e_k$ or an ancestor node of the data element of the in-coming message $e_k$. For example, if subscribers associated with a certain broker address have requested the topic "China", it is likely that the same subscribers will also be interested in receiving messages associated with a narrower topic "Shang Hai" or "Huangpu District". If messages with the topic "China" have previously been forwarded via the broker BR0, the data element "China" of these messages may appear as nodes in the clustering relation repository CRR. Now, when a message with the topic "Huangpu District" arrives at the broker BR0, the node having the data element "China" may be found in clustering relation repository CRR by looking for an ancestor node of the data element "Huangpu District".

Also the descendant nodes may be used as search terms. However, in that case it may be less likely that the subscribers will have an interest in the forwarded messages. For example, if subscribers associated with a certain broker address have requested the relatively narrow topic "Huangpu District", it is less likely that they will be interested in receiving messages having the topic "Shang Hai" or "China". However, the probability that these subscribers would be interested in receiving messages having the topic "Shang Hai" or "China" may still be substantially greater than zero. In this sense, use of the descendant nodes as search terms may also be relevant. If messages with the topic "Huangpu District" have previously been forwarded via the broker BR0, the data element "Huangpu District" of these messages may appear as nodes in the clustering relation repository CRR. Now, when a message with the topic "China" arrives at the broker BR0, the node having the data element "Huangpu District" may be found in the clustering relation repository CRR by looking for a descendant node of the data element "China".

FIG. 6c shows a semantic tree TREE3 for subjects. For example, a parent node $N_{RT}$ may define that the subject is a plant, and a child node $N_{B0}$, $N_{B1}$ may further specify that the plant is a flower or a tree. When the plant is a flower, a child node $N_{B0,C0}$, $N_{B0,C1}$, $N_{B0,C2}$ may further specify that the flower is a rose, a lily or a tulip.

FIG. 6d shows a personal relationship graph PGR1 defining relationships within a group of persons A1, A2 ... A5. The persons may be connected to each other with links $L_{12}$, $L_{13}$ ... $L_{45}$, wherein a link $L_{12}$ indicates a connection between persons A1 and A2, a link $L_{13}$ denotes a connection between the persons A1 and A3 etc. The links may also be called as the "edges".

The type of the relationship associated with each link L may be defined in a table PRGTAB1. For example, the type of relationship associated with the link $L_{12}$ may be "family", the type of relationship associated with the links $L_{13}$ and $L_{45}$ may be "friend", the type of relationship associated with the link $L_{15}$ may be "classmate", and the type of relationship associated with the link $L_{23}$ may be "colleague".

For example, when the in-coming message $e_k$ comprises a data element A1, the relation graph PGR1 may indicate that the nodes A2, A3 and A5 are directly linked to the node A1.

Thus, a search in the context relation clusters may comprise finding nodes, which at least approximately match the nodes A1, A2, A3, and A5. It may be noticed, that the node A4 is not directly linked to the node A1 in the graph PRG1. In an embodiment, the node A4 may be omitted when searching for nodes related to a data element A1.

For example, a message containing a photograph taken by a family member (A2), a message containing a photograph taken by a friend (A3), and a message containing a photograph taken by a classmate (A5) may be considered relevant, whereas a message containing a photograph taken by a friend (A4) of the classmate (A5) may be ignored.

Figure 7:
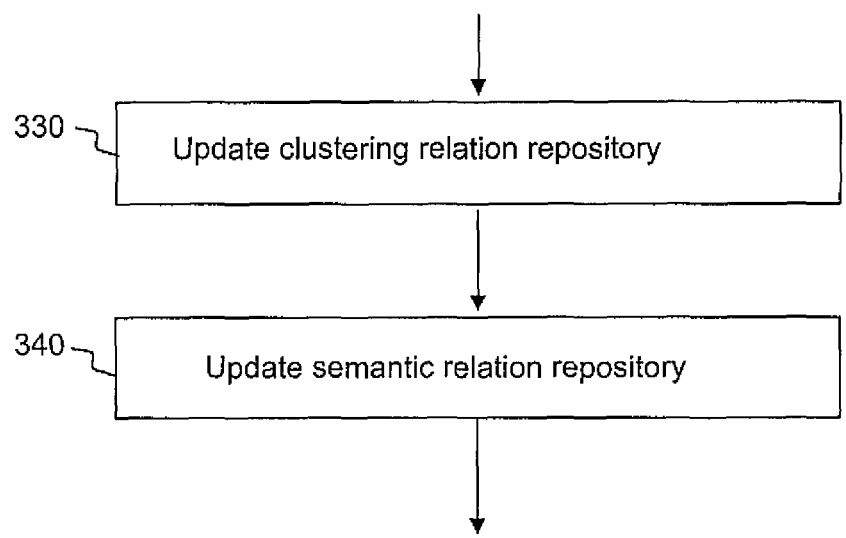
FIG. 7 shows, by way of example, updating a clustering relation repository and a semantic relation repository.

FIG. 7 shows updating of the repository BCN when a new in-coming message $e_k$ arrives at the first broker BR0. A data element of a subsequent message $e_{k+1}$ may be rapidly compared with data elements of previous messages by using the updated repository BCN.

In particular, the repository BCN should be updated so that a data element of a subsequent message $e_{k+1}$ which arrives at the first broker BR0 after the message $e_k$ can be searched fast and efficiently. The updating may comprise a step 330 where a new node is added to the context cluster repository CRR (see FIGS. 4, 5a and 5b). The updating may comprise adding one or more data elements of the message $e_k$ to one or more of the existing clusters $C_{1,LOC}$, $C_{1,TIM}$, $C_{1,SUBJ}$, $C_{1,AUT}$. The updating may comprise creating one or more new clusters $C_{1,LOC}$, $C_{1,TIM}$, $C_{1,SUBJ}$, $C_{1,AUT}$.

The updating may comprise a step 340 where a new node is added to a semantic hierarchy tree stored in the semantic relation repository SRR. (See FIGS. 6a-6c.). The updating may comprise a step where a new node is added to a personal relation graph (FIG. 6d). A new node may be added to a semantic hierarchy tree by using semantic information provided by an external service. The external service may be e.g. a hierarchical dictionary. The broker may send a request for establishing the location of a new node in a semantic hierarchy tree to an external service. The external service may send a response, and the broker may update the semantic hierarchy tree according to the response. The request may be sent e.g. when a data element of the in-coming message $e_k$ does not match with any nodes of the existing semantic hierarchy tree and the data element is not close to any of the existing clusters.

The clustering relation repository CRR may contain nodes, which correspond to data elements of previously forwarded messages. In an embodiment, the clustering relation repository CRR may be substantially empty when the operation of the broker BR0 is started for the first time.

The semantic relation repository SRR may contain a considerable number of nodes already when the broker BR0 is started for the first time.

Nodes stored in the clustering relation repository CRR may also contain one or more links (e.g. hash pointers) to individual subscriptions F1, F2 stored in the routing table RT0. Thus, when a matching node has been found in the clustering relation repository CRR, the broker BR0 may also check whether the routing table RT0 still contains at least one subscription F1 for a topic of the matching node. Thus, nodes may be eliminated from the clustering relation repository CRR according to cancelled subscriptions. Thus, the number of nodes associated with less popular topics may be kept low when compared with the number of nodes associated with very popular topics.

Alternatively, nodes may be deleted from the clustering relation repository CRR according to cancelled subscriptions, by a process called as the cascading delete.

Alternatively, each node of the clustering relation repository CRR may be deleted if a data element of a received and subscribed message has not matched with said node during a predetermined time period.

Figure 8A:
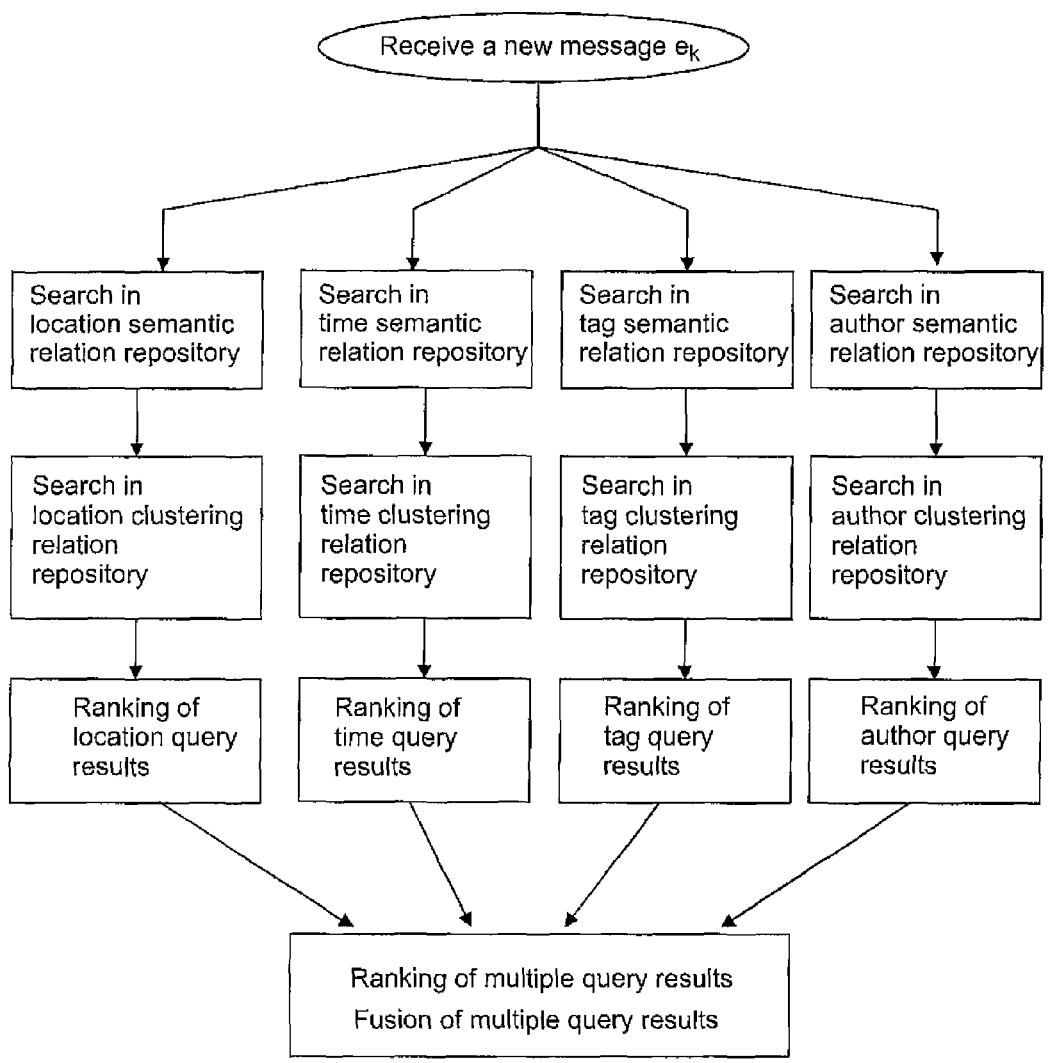
FIG. 8a shows, by way of example, comparing data elements of an in-coming message with data elements of previously sent messages.

FIG. 8a shows comparing a data element of an in-coming event $e_k$ with data elements stored in the clustering relation repository CRR. When a new message $e_k$ arrives at a first broker BR0, matching data elements may be searched in the clustering relation repository CRR.

Searches in the clustering relation repository CRR may be performed fast by using indexed tables (See FIG. 4). In particular, the indices may be arranged as search trees, preferably as B+ trees.

Several searches may be performed for the same in-coming message $e_k$. The searches may be performed e.g. in terms of spatial location, time, subject and/or author. The searches may be performed successively or substantially simultaneously.

The semantic relation repository SRR may contain data elements (topics) arranged in semantic hierarchy trees. The clustering relation repository CRR may contain data elements (topics) which are partitioned into clusters such that the data elements of an individual cluster are close to each other in terms of time, location, subject or author. Information stored in the semantic relation repository SRR may be used for finding auxiliary search terms. Information stored in the clustering relation repository CRR may be used for identifying the data elements of messages e1, e2, e3 . . . which at least approximately match with the search terms.

A search in the semantic relation repository SRR may provide auxiliary search terms, i.e. auxiliary data elements, which are semantic descendants of a data element of the in-coming event $e_k$. The auxiliary search terms may be found by using semantic hierarchy trees and/or by using relation graphs stored in the semantic relation repository. SRR The search may be expanded by using auxiliary data elements, which are ancestor nodes or descendant nodes of a data element of the in-coming message $e_k$. A broker BR0 may utilize the semantic trees and/or relation graphs TREE1, TREE2, TREES, PRG1 when performing searches in the context cluster repository. The broker BR0 may make additional queries for auxiliary nodes (search terms), which are semantic ancestors or descendants of a data element of the in-coming message $e_k$. The broker BR0 may make additional queries for auxiliary nodes (search terms), which are directly linked to a data element of the in-coming message $e_k$ in relation graph PRG1.

For example, when the data element of the in-coming message $e_k$ specifies a time "May 2008", the search may be expanded by using an auxiliary search term "Year 2008", in addition to the original search term "May 2008". The time period "Year 2008" is a semantic ancestor of the time period "May 2008". For example, when the data element of the in-coming message $e_k$ specifies a location "Shang Hai", then the search may be expanded by using semantic ancestors of the node "Shang Hai". According to the location semantic tree TREE2 shown in FIG. 6b, a search in the context cluster repository CRR may include:

finding messages whose data elements are spatially close to the data element "Shang Hai" (node $N_{B0}$ in FIG. 6b), and finding messages whose data elements are spatially close to the data element "China" (node $N_{RT}$ in FIG. 6b). The node $N_{RT}$ is an ancestor node of the node $N_{B0}$.

Additionally, a search in the context cluster repository CRR may also include finding messages whose data elements are spatially close to the data element "Huangpu District"

(node $N_{B1,C0}$) or close to the data element "Hongkou District" (node $N_{B1,C1}$). The nodes $N_{B1,C0}$ and $N_{B1,C1}$ are descendant nodes of the node $N_{RT}$.

Thus, the search in the context cluster repository CRR may be expanded by searching for nodes which at least approximately match a semantic ancestor and/or a descendant of the data element of the in-coming message $e_k$.

The semantic trees may contain a high number of levels. Consequently, the number of descendant nodes may be very high. When expanding a query, the path length may be limited in order to avoid excessive high number of search terms. When expanding the search (query), the path length from the data element of the in-coming message $e_k$ to an auxiliary search term may be kept smaller than or equal to a predetermined limit.

The path length between a first node and a second node means the number of links (edges) between the first node and the second node. For example, the path length from a node to a parent node is equal to 1, and the path length from a node to a grandparent node is equal to 2. The path length from a node to a child node is 1, and the path length from a node to a grandchild node is equal to 2. When expanding the search, the path length may be e.g. smaller than or equal to 2, which means that a parent node, a grandparent node, child nodes, and/or grandchild nodes may be included in the search.

A search in the context cluster relation repository CRR may comprise searching for nodes which at least approximately match a data element of the in-coming message $e_k$ and/or which at least approximately match a semantic ancestor of the data element of the in-coming message $e_k$, and/or which at least approximately match a semantic descendant of the data element of the in-coming message $e_k$, and/or which at least approximately match a node, which is directly linked to the data element of the in-coming message $e_k$ in a relation graph PRG1.

The merit value $SCORE_{ek,BR1}$ may be changed (e.g. increased by a predetermined amount) each time when an exact match or an approximate match is detected. The exact match means that the data element is identical to the topic. The approximate match means that the data element is close to the topic but different from the topic. In particular, the merit value $SCORE_{ek,BR1}$ may be increased when an exact match or an approximate match is detected. An approximate match may increase the merit value $SCORE_{ek,BR1}$ by a smaller amount than an exact match. A match with a semantic descendant may increase the merit value $SCORE_{ek,BR1}$ by a smaller amount than a match with a semantic ancestor. For example, a match with a semantic descendant may increase the merit value $SCORE_{ek,BR1}$ by a value 0.7, and a match with a semantic ancestor may increase the merit value $SCORE_{ek,BR1}$ by a value 1.0. Corresponding searches may be performed also for time, subject and/or author of the in-coming message $e_k$. Each matching or approximately matching node found during the searches may increase the merit value $SCORE_{ek,BR1}$.

If there are no matching search results, then the merit value $SCORE_{ek,BR1}$ may remain unchanged.

The first broker BR0 may be arranged to send the in-coming message $e_k$ to the broker BR1 when the merit value $SCORE_{ek,BR1}$ has reached or passed a predetermined value. In particular, the first broker BR0 may be arranged to send the in-coming message $e_k$ to the broker BR1 when the merit value $SCORE_{ek,BR1}$ exceeds a predetermined value.

If desired, the matching data elements and/or the approximately matching date elements found in the cluster relation repository CRR may be arranged as nodes of a multidimensional graph in the vicinity of a data point corresponding to the in-coming message $e_k$. The data point is defined by the data elements of the in-coming message $e_k$. The data point is a point of a multidimensional space defined by the date elements of the in-coming message $e_k$. The position of the point in the multidimensional space may be specified by three coordinates for location, one coordinate for time, one or more coordinates to define a subject, and one or more coordinates to define an author.

If desired, detected matches between nodes of the cluster relation repository CRR (associated with a predetermined broker BR1) and the data point of the in-coming message $e_k$ may be described as edges (links) of the multidimensional graph. A merit value $SCORE_{ek,BR1}$ for sending the message $e_k$ to the broker BR1 may be equal to the number of the edges (links) of the multidimensional graph.

If desired, each edge may also have an individual (different) weighing factor.

Alternatively, an individual merit value may be determined for each individual node of the multidimensional graph by counting the number of edges of said individual node. Only a predetermined number (e.g. 10) of nodes having the highest merit values may be considered when sending the message $e_k$ to the next broker(s).

Figure 8B:
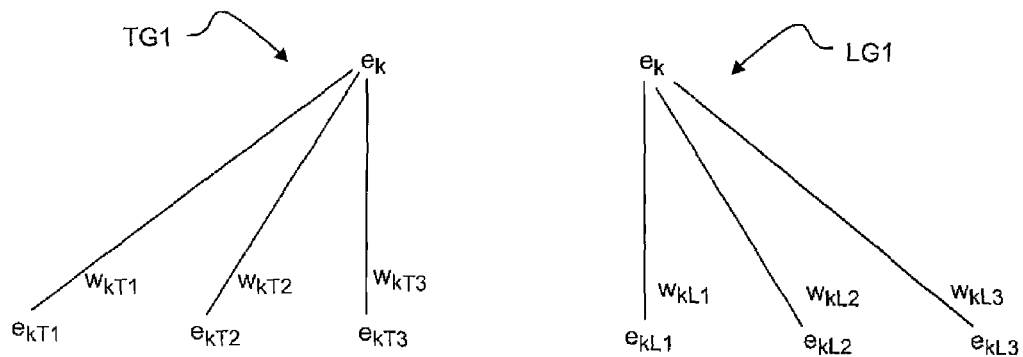
FIG. 8b shows, by way of example, a first graph representing nodes which are relevant according to a first criterion.
Figure 8C:
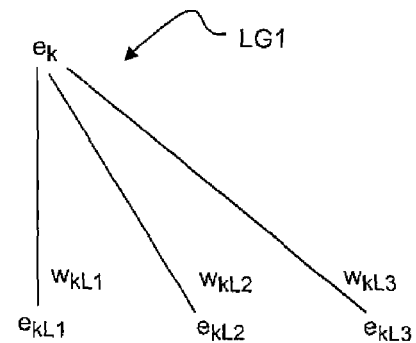
FIG. 8c shows, by way of example, a second graph representing nodes which are relevant according to a second criterion.
Figure 8D:
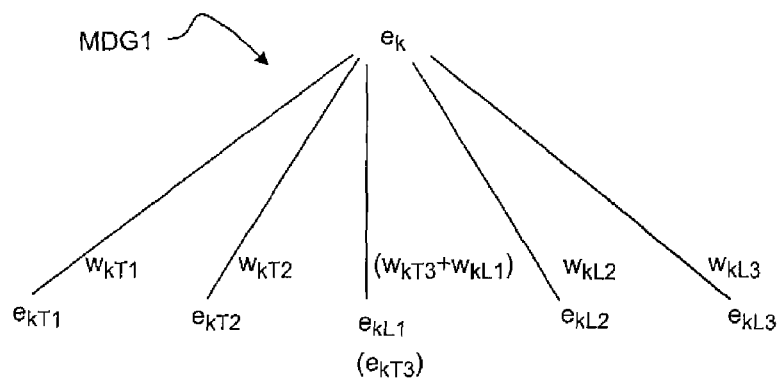
FIG. 8d shows, by way of example, a third graph representing nodes which are relevant according to the first criterion and according to the second criterion.

FIGS. 8b-8d illustrate fusing search results into a single multidimensional graph. Referring to FIG. 8b, data elements of messages $e_{kT1}$, $e_{kT2}$, $e_{kT3}$ may be temporally close to a data element of the in-coming message $e_k$, and they may be represented as a graph TG1 Referring to FIG. 8c, data elements of messages $e_{kL1}$, $e_{kL2}$, $e_{kL3}$ may be spatially close to a data element of the in-coming message $e_k$, and they may be represented as a graph LG1. The messages $e_{kT1}$, $e_{kT2}$, $e_{kT3}$ may be provided by a search in a time cluster repository. The messages $e_{kL1}$, $e_{kL2}$, $e_{kL3}$ may be provided by a search in a location cluster repository. Each node $e_{kT1}$, $e_{kT2}$, $e_{kT3}$, $e_{kL1}$, $e_{kL2}$, $e_{kL3}$ may be assigned a merit value $W_{kT1}$, $W_{kT2}$, $W_{kT3}$, $W_{kL1}$, $W_{kL2}$, $W_{kL3}$. The merit value may also be called as a weight factor. In an embodiment, the merit value $w_{kT1}$, $W_{kT2}$, $W_{kT3}$, $W_{kL1}$, $W_{kL2}$, $W_{kL3}$ of each relevant node may be equal to one.

Referring to FIG. 8d, the nodes of FIGS. 8b and 8c may be represented as a single multi-dimensional graph MDG1. The messages $e_{kT3}$ found in a time context search and the message $e_{kL1}$ found in a location context search may represent the same message. Thus, they may be merged and represented as a single node $e_{kL1}$ in the multi-dimensional graph MFG1 of FIG. 8d. The link (edge) between the node $e_{kL1}$ and the in-coming message $e_k$ may have a higher merit value $w_{kT3}+w_{kL1}$ than the remaining nodes, because the node $e_{kL1}$ is more relevant than the remaining nodes $e_{kT1}$, $e_{kT2}$, $e_{kL2}$, $e_{kL3}$. The node $e_{kL1}$ is temporally and spatially related to the in-coming message $e_k$, whereas the nodes $e_{kT1}$, $e_{kT2}$ are only temporally related to the in-coming message $e_k$, and the nodes $e_{kL2}$, $e_{kL3}$ are spatially related to the in-coming message $e_k$. If the combined merit value $w_{kT3}+w_{kL1}$ passes the limit $LIM_1$, the first broker BR0 may be arranged to send the in-coming message $e_k$ to a broker address of the previously sent message $e_{kL1}$.

In principle, fusing the results into a multidimensional graph MDG1 and determining the merit values for nodes of the multidimensional graph may provide the same result (i.e. one or more broker addresses) as making several separate searches and summing the merit values.

Figure 9:
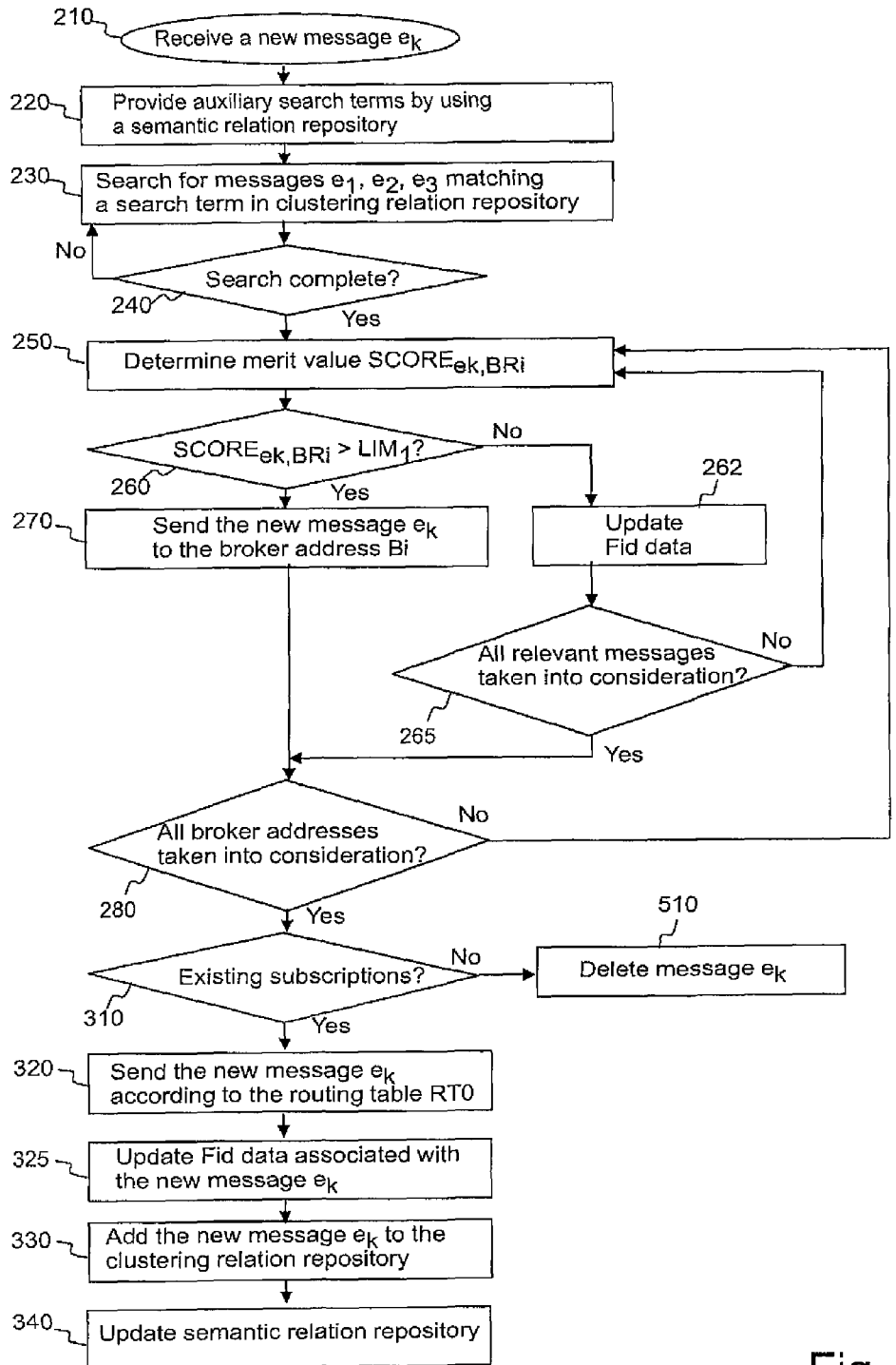
FIG. 9 shows, by way of example, method steps for routing an in-coming message.

FIG. 9 shows method steps for searching in the cluster relation repository CRR, for updating the cluster relation repository CRR, and for sending the in-coming message $e_k$ to one or more next brokers.

In step 210, a new message $e_k$ is received.

In step 220, additional search terms may be provided based on an original data element of the new message $e_k$, by using the semantic relation repository SRR. For example, when the original data element (search term) is "Shang Hai", an additional search term may be e.g. "China".

In step 230, matching nodes may be searched in the clustering relation repository CRR.

A data element may be considered to match with a search term when a difference or a distance between the data element in the repository CRR and the search term is smaller than a predetermined limit ($r_t$).

If desired, search and matching in semantic relation repositories and in context cluster repositories may be repeated for location, subject, and/or author. Thus, for a single in-coming message $e_k$, several searches may be performed by using location-specific search terms, time-specific search terms, subject-specific search terms and/or author-specific search terms.

The search may be continued until the search is complete (checking step 240), i.e. when all relevant search terms have been queried.

The merit value $SCORE_{ek,BRi}$ may be determined in the determining step 250. The search step 230 may provide one or more matching data elements stored in the clustering relation repository CRR. The matching data elements found in the steps 230 and 240 may be considered successively. Each matching data element associated with the broker address BRi may increase the merit value $SCORE_{ek,BRi}$ associated with the new message $e_k$ and the broker address BRi. Each matching node may increase (change) the value of the merit value $SCORE_{ek,BRi}$ e.g. by one. For each new message $e_k$ and broker address BRi, the initial value of the merit value $SCORE_{ek,BRi}$ may be e.g. equal to zero.

The merit value $SCORE_{ek,BRi}$ may be compared with a limit LIM1 in a comparing step 260. The limit LIM1 may be a predetermined value or a dynamically determined value. For example, the limit LIM1 may be dynamically determined such that the message $e_k$ is sent to a predetermined number of brokers.

The broker BR0 may be arranged to send the message $e_k$ to a broker address BRi if the merit value $SCORE_{ek,BR1}$ reaches or passes the limit LIM1. In particular, if the merit value $SCORE_{ek,BRi}$ exceeds the limit $LIM_1$, then the message $e_k$ may be sent to the corresponding broker BRi in step 270.

If the merit value $SCORE_{ek,BRi}$ does not exceed the limit $LIM_1$ after a topic (e.g. top3) of a previous message e3 has been taken into consideration, the identifier Fid2 of the subscription F2 for the message $e_3$ may be added to a list of identifiers Fid stored in an operational memory in step 262. The identifiers Fid stored in the operational memory may be used for accelerating a subsequent search in the routing table RT0.

In step 265, it may be checked whether all relevant messages have been taken into consideration. If all relevant matching messages found in the search step 230 have not yet been handled, a next message may be taken into consideration by repeating the merit value determining step 250 after the checking step 265. The step 262 may be repeated for each matching node found in the search step 230. The operational memory may comprise several identifiers Fid. The list of identifiers Fid stored in the operational memory may be used for accelerating a subsequent search in the routing table RT0 in step 310.

Substantially all matching elements may be taken into consideration by repeating the steps 250, 260, 262 and 265. When all matching data elements have been taken into consideration, the steps 250-280 may be repeated for a next broker address $BR_{i+1}$ until all relevant broker addresses have been taken consideration. The searching and matching process may be repeated for several brokers directly connected to the first broker BR0. The relevant broker addresses may be determined based on the matching nodes found in step 230.

When the relevant broker addresses have been considered, the data elements of the in-coming message $e_k$ may be compared with existing subscriptions F1, F2, . . . in step 310. In step 310, a search may be carried out by checking whether there are any subscriptions for the topic of the new message $e_k$ in the routing table RT0.

The search may accelerated by checking only those subscriptions which were not taken into consideration in the previous steps 250-280. As mentioned above, the operational memory may now comprise a list of identifiers Fid for subscriptions, which had a matching topic. There is no need to search for those (matching) subscriptions for a second time, because they can already be identified by using the list of identifiers Fid stored in the operational memory. If the topic of the new message $e_k$ did not match with any of the data elements stored in the clustering relation repository CRR, then the list of identifiers Fid stored in the operational memory may be empty, and the whole routing table RT0 may be searched.

The existence of at least one subscription for the message $e_k$ may be checked. If there are no subscriptions for the message $e_k$, the message may be deleted, stored or processed in some other predetermined way in step 510.

If there is at least one subscription for the in-coming message $e_k$, the message $e_k$ may be forwarded according to the routing table RT0 in step 320. Processing by using the conventional routing table RT0 was shown e.g. in FIG. 2.

The method may comprise:

determining a search term based on a topic of a new message $e_k$, carrying out a first search in the clustering relation repository CRR in order to find at least one data element matching with the search term, carrying out a second search in the routing table RT0 in order to find a subscription matching the topic of the new message $e_k$, wherein at least one subscription associated with a matching data element found in the first search is excluded from the second search in order to accelerate the second search, and controlling sending of the new message $e_k$ to a next broker BR1 according to the result of the first search and the second search.

If a search in the cluster relation repository CRR does not provide a match, the repository may be updated in step 330.

In step 325, the topic of the new message $e_k$ may be associated with the identifiers Fid1, Fid2 of one or more matching subscriptions F1, F2 (the identifiers were found in step 262). In step 330, the topic of the new message $e_k$ and the associated identifiers may be stored in the clustering relation repository CRR.

In step 330, one or more nodes corresponding to data elements of the in-coming message $e_k$ may be added to the clustering relation repository CRR. If desired, updating of the cluster relation repository CRR may conditional. For example, a new node may be added to the cluster relation repository CRR only if there is a certain minimum number of subscriptions for the message $e_k$.

In step 340, semantic trees and/or relation graphs may be updated or created.

The above-mentioned method steps may also be carried out in a different order. For example, the semantic relation repository SRR may be updated before updating the clustering relation repository CRR. For example the semantic relation repository SRR and the clustering relation repository CRR may be updated substantially simultaneously. For example, queries by using the different search terms may be carried out substantially simultaneously. For example, the step 262 for updating the list of identifiers Fid may be carried out between the determining step 250 and the comparing step 260. For example, merit values $SCORE_{ek,BRi}$ may be determined substantially simultaneously for several different broker addresses BRi. Parallel data processing may be used. For example, the message $e_k$ may be sent substantially simultaneously to several different broker addresses BRi If a previous message $e_1$ has been stored in the relation repository when a subsequent new message $e_k$ arrives, and if the topic of the new message $e_k$ matches with the topic of the previous message e1, there is no need to check the whole routing table RT0. It may be enough if only the incremental parts of the routing table RT0 are checked.

Without the clustering relation repository CRR, the whole routing table RT0 should be searched again. The routing table RT0 may comprise e.g. millions of subscriptions, and the associated time cost may be very high.

Using the clustering relation repository CRR and using the routing table RT0 represent a first step and a second step. In the first step, matching data elements may be searched in the clustering relation repository CRR. In the second step, matching subscriptions may be searched in the routing table RT0. In the second step, the search in the routing table RT0 may be accelerated, because there is no need to search for those matching subscriptions which were identified already during the first step.

Thus, the use of the clustering relation repository CRR may accelerate the matching procedure. Even in the worst case, the matching time may be equal to the matching time of a conventional method which only utilizes the routing table RT0. When using the clustering relation repository CRR, it is likely that the matching time can be considerably reduced.

Figure 10:
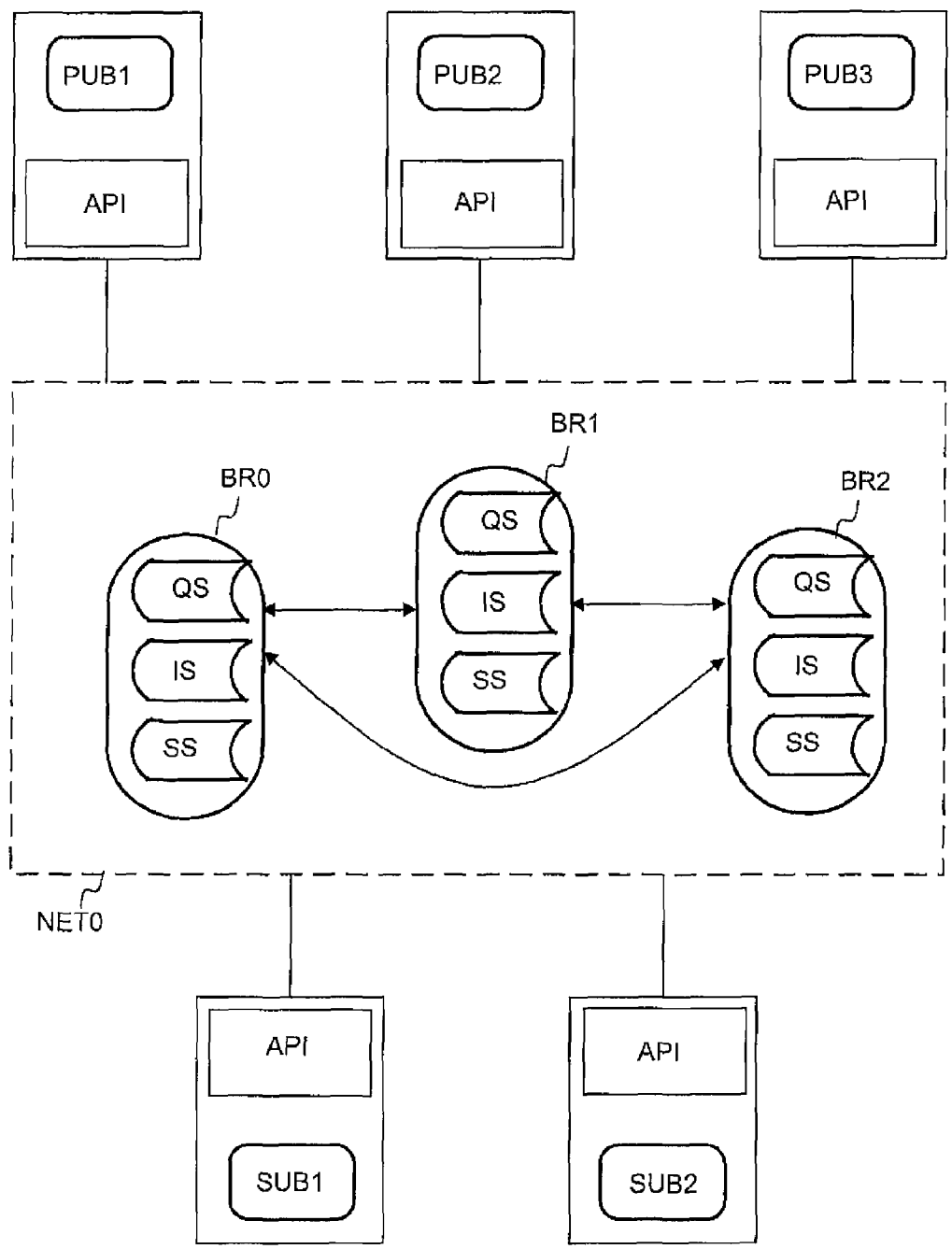
FIG. 10 shows, by way of example, an implementation of the communications system.

FIG. 10 shows implementation of a publish/subscribe system. The publishers PUB1, PUB2, PUB3 may communicate with the brokers NR0, BR1, BR2 by using application programming interfaces API. The subscribers SUB1, SUB2 may communicate with the brokers NR0, BR1, BR2 by using application programming interfaces API. In particular, the application programming interfaces may be Oracle Message Broker application programming interfaces (OMB-API). "Oracle" is a trade mark of Oracle Corporation.

A publisher PUB1 may call an application programming interface API for sending a message $e_k$ to the broker network NET0.

A subscriber SUB1 may call an application programming interface API for sending a subscription to the broker network NET0

A broker BR0 may comprise an index service IS and a query service QS. The index service IS may implement updating the semantic relation repository SRR and/or the context cluster repository CRR. The query service QS may implement search and matching in the semantic relation repository SRR and the context cluster repository CRR.

Figure 11:
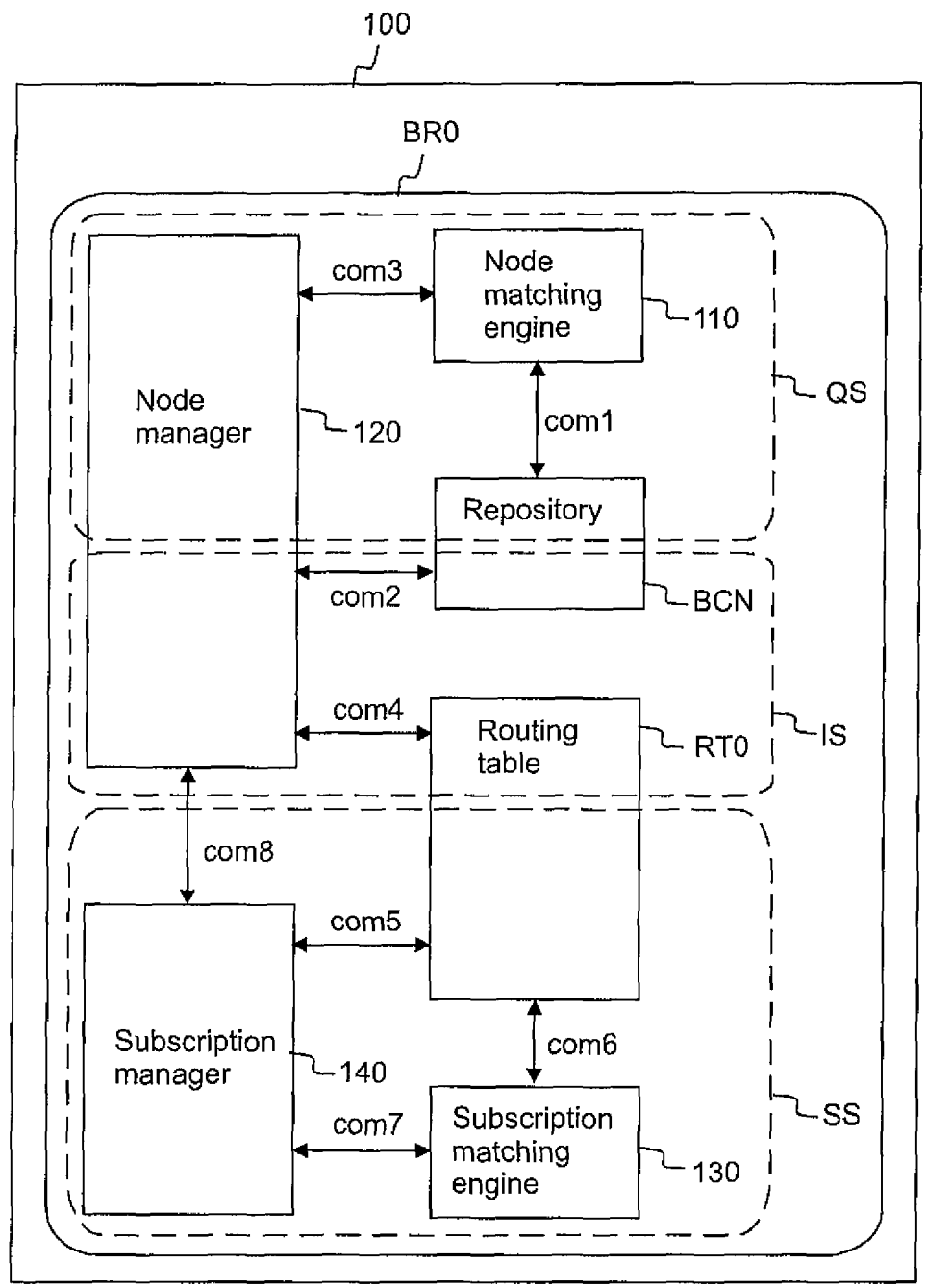
FIG. 11 shows, by way of example, units of a message broker.

The brokers BR0, BR1, BR2 may also provide a subscription service SS (see FIG. 11).

The publishers PUB1, PUB2, PUB 3 may be e.g. computers, Personal Digital Assistants (PDA), mobile phones, digital cameras, automatic surveillance cameras, automatic weather stations, or measuring instruments. The subscribers may be e.g. computers, Personal Digital Assistants (PDA), televisions, or mobile phones.

The message $e_k$ may be an image, e.g. an image of a person, family, animal, plant, building, and/or landscape. The message may comprise metadata, which specifies the topic or topics of the message. The metadata may specify e.g. that the message is an image of a lily (flower) taken in Hai dian district on 1 Jan. 2008 by a person A1. In this case, the metadata may contain e.g. the following elements:

Element 1 (message type) "image"
    Element 2 (subject) "lily"
    Element 3 (location) "Haidian"
    Element 4 (date) "1 Jan. 2008"
    Element 5 (author) "person A1"

The data elements (topics) of a message may also be generated automatically by analyzing the contents of the message. For example, the topic of an image may be generated by an image recognition method. The image recognition method may comprise comparing the image with other images stored in a database.

The broker BR0 may be configured to perform normalizing data elements, identifying data elements, deleting stop words, stemming data elements (terms), extracting index entries, creating index (e.g. inverted lists), tokenizing, and/or parsing The message $e_k$ may contain a video.

Initially, when no messages have arrived at the first broker BR0, the clustering relation repository CRR may be empty.

The embodiments of the invention may be methods, apparatus and computer programs for distributing messages in a publish/subscribe messaging network NET0.

FIG. 11 shows, by way of example, units of a message broker BR0. The broker BR0 may be implemented in a data processing system 100. The broker NR0 may comprise a relation repository BCN, a node matching engine 110, and a node manager 120. The broker NR0 may further comprise a routing table RT0, a subscription manager 140, and a subscription matching engine 130.

The broker BR0 may be configured to provide a query service QS, an updating service IS (index service), and/or a subscription service SS. The query service QS may take care of the searching and matching in the clustering relation repository CRR and for expanding the search by using the semantic relation repository SRR. The query service QS may also take care of forwarding an in-coming message when a sufficient number of matching nodes are found in the clustering relation repository CRR. The index service may update the clustering relation repository CRR according to previously forwarded messages, by taking into account existing subscriptions. The subscription service SS may take care of updating the routing table and/or the subscription service SS may take care of delivering messages according to existing subscriptions.

For an in-coming message, the query service QS may be carried out considerably earlier than the index service IS and/or the subscription service SS. This may facilitate reliable operation of the broker in an overload situation, i.e. when the broker BR0 receives messages at a higher rate than what can be processed and forwarded according to the routing table RT0. In an embodiment, the index service IS and/or the subscription service SS may be carried out when messages arrive at the broker BR0 at a low rate, e.g. during nighttime.

The node matching engine 110 may search for matching nodes in the clustering relation repository CRR. The node manager 120 may add a node to the clustering relation repository CRR and/or the node manager 120 may remove a node from the clustering relation repository CRR based on subscriptions stored in the routing table RT0. The node manager 120 may control operation of the node matching engine 110.

The subscription manager 140 may add a subscription to the routing table RT0, and it may cancel a subscription from the routing table RT0. The subscription matching engine 130 may search for matching subscriptions in the routing table RT0. The subscription manager 140 may control operation of the subscription matching engine 130.

When subscriptions are canceled from the routing table RT0, corresponding nodes may be removed from the clustering relation repository CRR e.g. by a process called "cascading delete". In particular, the subscription manager 140 and/or the node manager 120 may be arranged to delete nodes from the clustering relation repository CRR according to canceled subscriptions.

The marking com1 denotes communication between the node matching engine 110 and the repository BCN, com2 denotes a communication between the node manager 120 and the repository BCN, com3 denotes communication between the node manager 120 and the node matching engine 110, com4 denotes communication between the node manager 120 and the routing table RT0, com5 denotes communication between the subscription manager 140 and the routing table RT0, com6 denotes communication between the routing table RT0 and the subscription matching engine 130, com7 denotes communication between the subscription manager 140 and the subscription matching engine 130, and com8 denotes communication between the node manager 120 and the subscription manager 140.

The list of identifiers Fid associated with matching nodes found in the clustering relation repository CRR may be communicated (com8) e.g. from the node manager 120 or from the node matching engine 110 to the subscription manager 140 or to the subscription matching engine 130. The list of identifiers Fid may be used for accelerating a search in the routing table RT0 (see discussion of FIG. 9).

Publishers PUB1, PUB2, PUB3 running on respective data processing systems may publish messages $e_k$ that can be received by multiple subscribers SUB1, SUB2. The publishers PUB1, PUB2, PUB3 may send messages $e_k$ to an intermediate publish/subscribe message broker BR0. The publishers PUB1, PUB2, PUB3 and subscribers SUB1, SUB2 do not need direct connections between them and do not need each other's address information. Instead, the publishers may send messages $e_k$ to the broker BR0. The message $e_k$ may include metadata such as data elements specifying message topics. The publishers PUB1, PUB2, PUB3 may use application programs that rely on message transfer functions of underlying messaging infrastructure product that hold network address and other communication information for the broker BR0.

The message broker BR0 may be implemented on a data processing system that is separate from the publisher systems and separate from subscriber's systems. The message broker BR0 may comprise a subscription matching engine and an associated routing table RT0. Subscribers SUB1, SUB2 may register with the broker BR0 and indicate their interest in particular information such as by specifying a particular message topic or topics. The subscribers' requirements may be stored at the broker BR0. A broker can store network addresses and protocol requirements for individual subscriber systems and the broker can initiate a connection. Alternatively, the broker BR0 may merely store names of subscriber systems and of their subscriptions, and the network and communications information may be held at the subscriber's system. The network and communications information may be used when the subscriber initiates a connection to the broker.

The node matching engine 110 at the broker BR0 may be arranged to compare search terms with data elements stored in the clustering relation repository CRR in order to determine whether an in-coming message $e_k$ should be forwarded to a predetermined broker address. Consequently, the broker BR0 may be arranged to forward the in-coming message $e_k$ to relevant brokers BR1, BR2, which in turn may forward the in-coming message $e_k$ to the interested subscribers. Although only a small number of publishers and subscribers are shown in FIGS. 3a and 10, there may be many publishers and many subscribers within the network and the publish/subscribe broker may be part of a distributed broker network, For cost reasons and in order to facilitate ongoing development, the units 110, 120, 130 and/or 140 of the broker BR0 may be implemented in computer program code. The computer program code may be stored in a machine computer-readable medium. The program code, when executed by a data processor, may implement the message forwarding according to the present invention.

The publish/subscribe broker BR0, the publisher applications and the subscriber applications may be implemented in computer program code. The code may be written in an object oriented programming language such as C++, Java™ or SmallTalk or in a procedural programming language such as the C programming language. These program code components may execute on a general purpose computer or on a specialized data processing apparatus. Program code implementing some features and aspects of the invention may be executed on a single data processing device or may be distributed across a plurality of data processing systems within a data processing network such as a Local Area Network (LAN) a Wide Area Network (WAN), or the Internet. The connections between different systems and devices within such a network may be wired or wireless and are not limited to any particular communication protocols or data formats and the data processing systems in such a network may be heterogeneous systems.

The publish/subscribe broker BR0 may be a component of an edge server (i.e. the broker may be one of a set of Web server or application server components) or a network gateway device. The broker BR0 may also be used e.g. in remote telemetry applications.

The invention may be implemented in networks that include wirelessly-connected PDAs, mobile telephones and/or automated sensor devices as well as networks that include complex and high performance computer systems.

The invention may be applicable to publish/subscribe communications environments that rely on a distributed broker network.

Other brokers BR1, BR2 of the network NET0 and/or the subscribers SUB1, SUB2 may also be configured to use proximity matching and/or semantic matching in order to match messages topics with subscriptions, so that the messages can be delivered all the way to the relevant subscribers SUB1, SUB2. Otherwise a subsequent broker or a subscriber might reject a message which does not exactly match with a subscription.

The broker BR0 may comprise a deadlock handling system, in order to prevent indefinite circulation of the same message in the network.

For the person skilled in the art, it will be clear that modifications and variations of the devices according to the present invention are perceivable. The figures are schematic. The particular embodiments described above with reference to the accompanying drawings are illustrative only and not meant to limit the scope of the invention, which is defined by the appended claims.

What is claimed is:

1. A method, comprising:
  causing storage of a set of subscriptions in a routing table of a first broker, causing sending of a set of messages from the first broker to a second broker according to at least one subscription stored in the routing table, receiving a subsequent message, determining a search term based on a data element of the subsequent message, comparing the search term with a set of data elements stored in an operational memory of a repository, controlling sending of the subsequent message to the second broker according to a result of said comparison, wherein the set of data elements stored in the operational memory of the repository comprises data elements of the messages previously sent to the second broker, and wherein said set of subscriptions contains at least one subscription, which specifies a topic, which is not contained in the set of data elements stored in the operational memory of the repository, and adding a new data point to the operational memory of the repository when the subsequent message has been subscribed by at least one subscriber and no matching data elements are found in the operational memory of the repository.

2. The method of claim 1 comprising:

searching for a data element in the operational memory of the repository such that a data element is considered to match with the search term when a difference or a distance between the data element in the operational memory of the repository and the search term is smaller than a predetermined limit, and controlling sending of the subsequent message to the second broker based on a result of said searching.

3. The method of claim 2 comprising changing a merit value when a matching data element is found.

4. The method of claim 3 comprising providing for sending the subsequent message to the second broker when the merit value passes a first limit.

5. The method according to claim 1 wherein the search term is at least one of
a data element of the subsequent message,
an ancestor node of the data element of the subsequent message in a semantic hierarchy tree and
a descendant node of the data element of the subsequent message in a semantic hierarchy tree.

6. The method according to claim 1 wherein a data element of the subsequent message specifies at least one of a time, a location, a subject and an author.

7. The method according to claim 1 wherein the subsequent message contains an image.

8. The method according to claim 1 further comprising using an index table, which comprises a plurality of indexed data elements associated with pointers, wherein a pointer associated with an indexed data element indicates a cluster of data elements stored in the operational memory of the repository, and the distance between each data element of the cluster and the indexed data element is smaller than or equal to a predetermined distance.

9. The method of claim 1, wherein the repository is at least one of a clustering relation repository or a semantic relation repository.

10. An apparatus comprising a first broker, wherein the first broker is configured:
to provide for storage of a set of subscriptions in a routing table,
to provide for sending of a set of messages from the first broker to a second broker according to at least one subscription,
to receive a subsequent message to the first broker,
to determine a search term based on a data element of the subsequent message,
to compare the search term with a set of data elements stored in an operational memory of a repository,
to control sending of the subsequent message to the second broker according to a result of said comparison, wherein the set of data elements stored in the operational memory of the repository comprises data elements of the messages previously sent to the second broker, and said set of subscriptions contains at least one existing subscription, which specifies a topic, which is not contained in the set of data elements stored in the operational memory of the repository, and
to add a new data point to the operational memory of the repository when the subsequent message has been subscribed by at least one subscriber, and no matching data elements are found in the operational memory of the repository.

11. The apparatus of claim 10, wherein said broker is configured:
to search for a data element in the operational memory of the repository such that a data element is considered to match with the search term when a difference or a distance between the data element in the operational memory of the repository and the search term is smaller than a predetermined limit, and
to control sending of the subsequent message to the second broker according to a result of said searching.

12. The apparatus of claim 11, wherein said broker is configured to change a merit value when a matching data element is found.

13. The apparatus of claim 12, wherein said broker is configured to provide for sending the subsequent message to the second broker when the merit value passes a limit.

14. The apparatus according to claim 10 wherein the search term is at least one of
a data element of the subsequent message,
an ancestor node of the data element of the subsequent message in a semantic hierarchy tree and
a descendant node of the data element of the subsequent message in a semantic hierarchy tree.

15. The apparatus according to claim 10 wherein a data element of the subsequent message specifies at least one of a time, a location, a subject and an author.

16. The apparatus according to claim 10 wherein the subsequent message contains an image.

17. The apparatus according to claim 10 further comprising using an index table, which comprises a plurality of indexed data elements associated with pointers, wherein a pointer associated with an indexed data element indicates a cluster of data elements stored in the repository, and the distance between each data element of the cluster and the indexed data element is smaller than or equal to a predetermined distance.

18. The apparatus of claim 10, wherein the repository is at least one of a clustering relation repository or a semantic relation repository.

19. A computer program product comprising at least one non-transitory computer-readable storage medium having computer-readable program instructions stored therein, the computer-readable program instructions comprising:
program instructions configured to provide for storage of a set of subscriptions in a routing table of a first broker,
program instructions configured to provide for sending a set of messages from the first broker to a second broker according to at least one subscription stored in the routing table, program instructions configured to receive a subsequent message, program instructions configured to determine a search term based on a data element of the subsequent message, program instructions configured to compare the search term with a set of data elements stored in an operational memory of a repository, program instructions configured to control sending of the subsequent message to the second broker according to a result of said comparison, wherein the set of data elements stored in the operational memory of the repository comprises data elements of the messages previously sent to the second broker, and wherein said set of subscriptions contains at least one subscription, which specifies a topic, which is not contained in the set of data elements stored in the operational memory of the repository; and program instructions configured to add a new data point to the operational memory of the repository when the subsequent message has been subscribed by at least one subscriber, and no matching data elements are found in the operational memory of the repository.

20. The computer program product of claim 19, wherein the repository is at least one of a clustering relation repository or a semantic relation repository.

* * * * *